United States Patent
Kamibayashi et al.

(10) Patent No.: US 6,847,950 B1
(45) Date of Patent: Jan. 25, 2005

(54) CONTENTS MANAGING METHOD AND CONTENTS MANAGING APPARATUS

(75) Inventors: Toru Kamibayashi, Chigasaki (JP); Masafumi Tamura, Chofu (JP); Taku Kato, Kamakura (JP); Yasuhiro Ishibashi, Ome (JP); Hisashi Yamada, Yokohama (JP); Hideyuki Toma, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/539,416

(22) Filed: Mar. 30, 2000

(30) Foreign Application Priority Data

Apr. 30, 1999 (JP) ............................................ 11-124182

(51) Int. Cl.[7] ............................................ G06F 17/60
(52) U.S. Cl. ................................ 705/57; 705/1; 705/51
(58) Field of Search ............................................ 705/57

(56) References Cited

U.S. PATENT DOCUMENTS 5,761,301 A * 6/1998 Oshima et al. ............. 235/494
5,956,688 A * 9/1999 Kokubo et al. ............. 345/781
6,034,832 A * 3/2000 Ichimura et al. ............. 360/60
6,070,171 A * 5/2000 Snyder et al. ................ 705/55

FOREIGN PATENT DOCUMENTS

JP            407057481 A  *  3/1995  ........... G06F/12/02

OTHER PUBLICATIONS

SDMI Portable Device Specification Version 1.0 8, Jul. 1999.*

* cited by examiner

Primary Examiner—James P. Trammell
Assistant Examiner—John Winter
(74) Attorney, Agent, or Firm—Finnegan, Henderson, Farabow, Garrett & Dunner, L.L.P.

(57) ABSTRACT

A contents managing method of regulating a number of copied contents storable on a storage medium includes giving a predetermined number of copyable contents for each content, recording the copied contents on the storage medium upon reception of an instruction for copy recording on the storage medium when there is a remainder in the number of copyable contents, decrementing the number of copyable contents by "1" every time one copied content is recorded on the storage medium at a time of recording, and incrementing the number of copyable contents by "1" every time one copied content is erased from the storage medium upon reception of an instruction to erase the copied contents from the storage medium.

18 Claims, 22 Drawing Sheets

MEMORY AREA (LCM, PD, MC)

PUBLIC AREA

SECRET AREA

BOOK AFTER CHECKOUT

BOOK AFTER CHECKIN

CONTENTS MANAGING METHOD AND CONTENTS MANAGING APPARATUS

CROSS-REFERENCE TO RELATED APPLICATION

This application is based upon and claims the benefit of priority from the prior Japanese Patent Application No. 11-124182, filed Apr. 30, 1999, the entire contents of which are incorporated herein by reference.

BACKGROUND OF THE INVENTION

The present invention relates to a contents managing method for regulating the number of replicated contents, such as music pieces and movies, that can be stored on a storage medium, and a contents managing apparatus which uses this method.

Conventionally, copy management has been performed on contents (works or the like). The copyright protection and the users' convenience have been balanced by managing the copy generation and the number of copies.

The concept of "moving" has emerged as a replacement of the copy management. Copying does not erase the original data, whereas "moving" transfers data to a different location (medium) and erases the original data. The copy protection by moving" has appeared to cope with the digitalization of contents and the popularity of networks or the like.

As it recently becomes possible to copy originals with high fidelity over a network or the like, the copy management alone cannot guarantee adequate copyright protection. Further, it is not possible to implement copyright control on unlimited moving of contents from one medium to another, e.g., distribution of data (by moving) for a business purpose.

BRIEF SUMMARY OF THE INVENTION

Accordingly, it is an object of the present invention to provide a contents managing method which can protect the copyright of contents by restricting the replication of contents by regulating the number of copied contents that can be stored on a storage medium, and a contents managing apparatus which uses this method.

According to one aspect of the present invention, there is provided a contents managing method for regulating a number of copied contents storable on a storage medium, the method comprising giving a predetermined number of copyable contents for each content; recording the copied contents on the storage medium upon reception of an instruction for copy recording on the storage medium when there is a remainder in the number of copyable contents; decrementing the number of copyable contents by "1" every time one copied content is recorded on the storage medium at the time of recording; and incrementing the number of copyable contents by "1" every time one copied content is erased from the storage medium upon reception of an instruction to erase the copied contents from the storage medium.

The method may further comprise recording information necessary to reproduce the copied contents in a secret area provided in a memory area on the storage medium and accessible by secret specific procedures.

The method may further comprise recording at least the number of copyable contents for each content in a secret memory area accessible by secret specific procedures.

The method may further comprise recording at least the number of copyable contents for each content and identification information of the storage medium having stored the copied contents in a secret memory area accessible by secret specific procedures; and erasing the copied contents from the storage medium only when the identification information of the storage medium is stored in the secret memory area.

The method may further comprise recording information necessary to reproduce the copied contents and flag information indicating whether or not the copied contents can be moved in a secret area provided in a memory area on the storage medium and accessible by secret specific procedures, at the time of recording the copied contents on the storage medium; and determining if moving of the copied contents is allowable by referring to the flag information.

The method may further comprise interrupting a subsequent process when a time needed for reading or writing of data to the storage medium does not lie within a predetermined time.

In the method, the storage medium may be one of a first type of storage medium having identification information of the storage medium stored therein and having a secret area provided therein which is accessible only by secret specific procedures, a second type of storage medium which does not have the secret area but has the identification information of the storage medium, and a third type of storage medium which has neither the secret area nor the identification information of the storage medium. In this case, at the time of recording copied contents on the storage medium, erasing copied contents from the storage medium or reproducing copied contents stored on the storage medium, the type of the storage medium is determined and then a process according to the type is performed.

According to another aspect of the present invention, there is provided a contents managing apparatus for regulating a number of copied contents storable on a storage medium comprising contents copy recording means for giving a predetermined number of copyable contents for each content, recording the copied contents on the storage medium upon reception of an instruction for copy recording on the storage medium when there is a remainder in the number of copyable contents, and decrementing the number of copyable contents by "1" every time one copied content is recorded on the storage medium at a time of recording; and contents copy moving means for incrementing the number of copyable contents by "1" every time one copied content is erased from the storage medium upon reception of an instruction to erase the copied contents from the storage medium.

The apparatus may further comprise means for recording information necessary to reproduce the copied contents in a secret area provided in a memory area on the storage medium and accessible by secret specific procedures.

The apparatus may further comprise means for recording at least the number of copyable contents for each content in a secret memory area accessible by secret specific procedures.

The apparatus may further comprise means for recording at least the number of copyable contents for each content and identification information of the storage medium having stored the copied contents in a secret memory area accessible by secret specific procedures; and means for erasing the copied contents from the storage medium only when the identification information of the storage medium is stored in the secret memory area.

The apparatus may further comprise means for recording information necessary to reproduce the copied contents and flag information indicating whether or not the copied contents can be moved in a secret area provided in a memory area on the storage medium and accessible by secret specific procedures; and means for determining if moving of the copied contents is allowable by referring to the flag information.

The apparatus may further comprise means for interrupting a subsequent process when a time needed for reading or writing of data to the storage medium does not lie within a predetermined time.

The apparatus may further comprise discrimination means for determining which one of a first type of storage medium having identification information of the storage medium stored therein and having a secret area provided therein which is accessible only by secret specific procedures, a second type of storage medium which does not have the secret area but has the identification information of the storage medium, and a third type of storage medium which has neither the secret area nor the identification information of the storage medium the storage medium is, at a time of recording copied contents on the storage medium, erasing copied contents from the storage medium or reproducing copied contents stored on the storage medium. In this case, this apparatus may further comprise means for performing a process according to the type of the storage medium determined by the discrimination means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

A preferred embodiment of the present invention will now be described with reference to the accompanying drawings.

Figure 1:
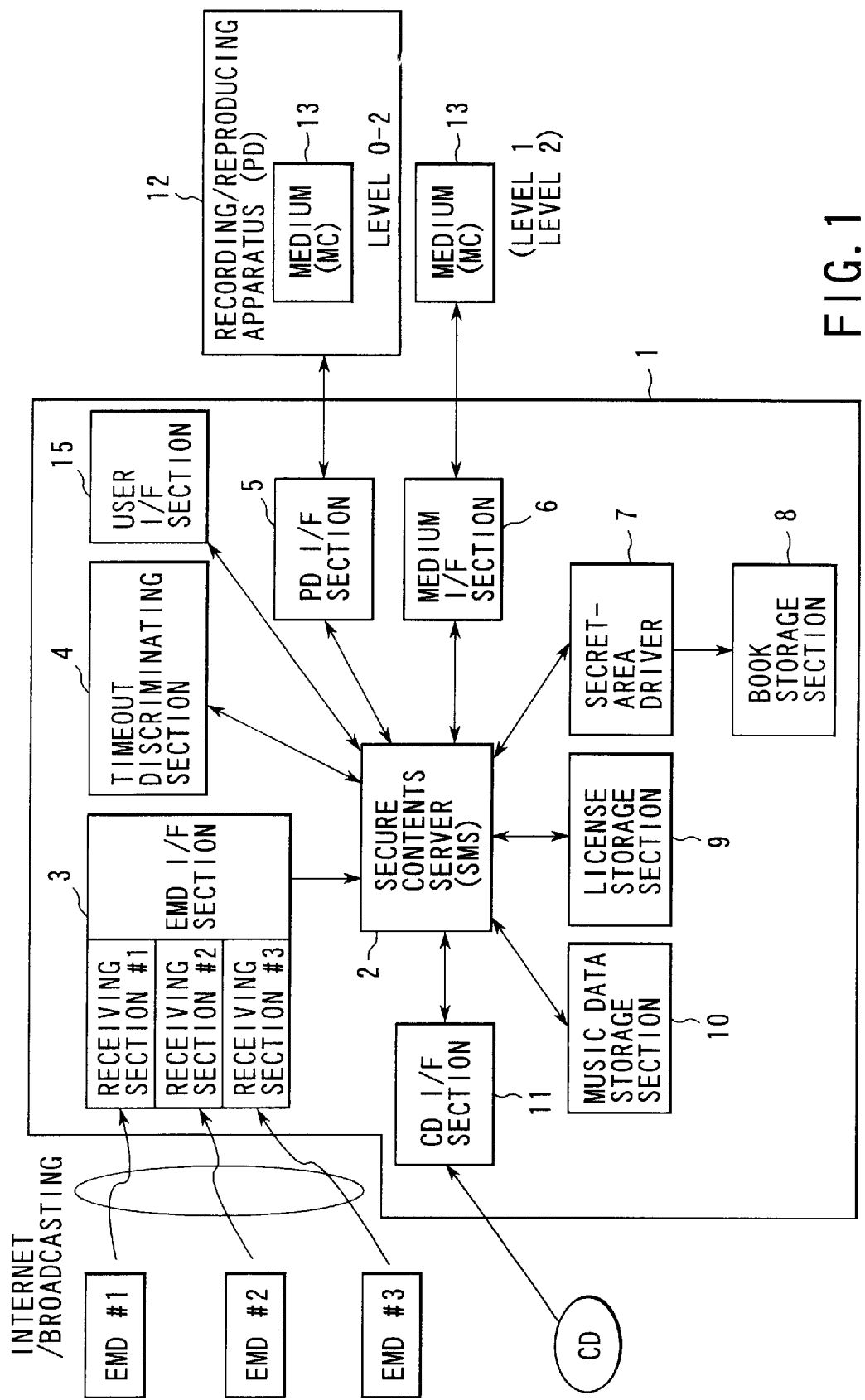
FIG. 1 is a diagram exemplifying the structure of a music contents usage managing system (LCM) which uses a contents managing method of regulating the number of copied contents storable on a storage medium according to one embodiment of the present invention.

FIG. 1 is a diagram exemplifying the structure of a music contents usage managing system (which will hereinafter be simply called "LCM" occasionally) that uses a contents managing method of regulating the number of copied contents storable on a storage medium according to this embodiment. Although music pieces are used here as one example of contents, contents are not limited to this particular type but may be movies, game software, etc. as well. A storage medium is not limited to a memory card (MC), which is used in this embodiment, but various other kinds of storage media such as a floppy disk and DVD may be used as well.

An EMD (Electronic Music Distributor) is a music distributing server or a music distribution broadcasting station.

A contents usage managing system 1 is, for example, a personal computer (PC) and comprises receiving sections #1 to #3 association with a plurality of EMDS (EMDS #1 to #3 in this example). The contents usage managing system 1 receives encrypted contents distributed by each EMD or the license of the contents (a usage condition and an encrypted-contents decryption key) or the like. The receiving sections #1 to #3 may have a playback capability and/or a charging capability. The playback capability is used to listen to distributed music contents. The charging capability is used in purchasing desirable contents.

The LCM 1 further comprises a secure contents server (secure music server (SMS) in this example) 2, which will hereinafter be simply called "SMS" occasionally. Any content purchased by a user is stored in the SMS 2 via an EMD interface (I/F) section 3. As needed, the EMD I/F section 3 decrypts a music content, and performs format conversion or re-encryption. When the SMS 2 receives an encrypted content, the SMS 2 stores it in a music data storage section 10 and stores a music-data decryption key in a license storage section 9. The SMS 2 may have a playback capability, which can allow the SMS 2 to playback a music content it manages on a PC.

The SMS 2 has a capability of outputting contents data to a medium (which will hereinafter be simply called "MC" (Memory Card) occasionally) 13. The MC 13 can be loaded into a recording/reproducing apparatus (which will hereinafter be simply called "PD" (Portable Device) occasionally) 12 to playback the contents recorded in the MC 13.

Recording contents in the MC 13 from the SMS 2 can be carried out directly via a media (MC) interface (I/F) section 6 or can be performed via the PD 12.

The MC 13 has an unrewritable identification (ID) information (MID) specific to that medium, and any content stored in the MC 13 is encrypted with a contents decryption key which depends on the MC 13.

The contents decryption key is encrypted with an encryption key Kp stored inside the media I/F section 6 and the PD 12 and the encrypted key is then recorded in the MC 13.

The contents and the contents decryption key in the MC 13 can be copied to any separate storage medium (hereinafter referred to as MCb) with the following restrictions.

1. Since the legitimate PD 12 alone has the encryption key Kp, only the legitimate PD 12 can play back the contents stored in the MCb.

2. Because the ID information MID of the MC 13 cannot be copied, however, the ID information MID of the MCb differs from the ID information MID of the MC 13 which has made the copy, eventually disabling adequate reproduction of the contents copied in the MCb. That is, multiple copying of the copied contents recorded in the MC 13 from one MC to another is prevented.

The above has described the conventional structure of the LCM 1. A method and structure according to this embodiment will now be discussed.

To begin with, checkin/checkout will be discussed with respect to the LCM 1 in FIG. 1.

"Checkout" is the action of the LMS 1 which holds a "parent" content to copy its replica as a "child" content into the MC 13. While the "child" content can be freely played back on the PD 12, it is prohibited to create a "grandchild" content from the "child" content. The number of "children" the "parent" can produce is defined as the attribute of the "parent". "Checkin" is to connect, for example, the MC 13 to the LCM 1 and cause the LCM 1 to erase (or disable the use of) a "child" content. This action can allow a "parent" content in the LCM 1 to regain the right to produce one "child" content. This is also called "checkin to "parent"".

When one attempts to accomplish this checkin/checkout simply by the conventional LCM 1, the following attack actually occurs. A "child" stored in the MC 13 is saved on a separate storage medium (excluding MID), and the "child" in the MC 13 is let to check in the "parent". Next, the previously saved "child" is written back into the MC 13. Because checkin has already been finished, the "parent" on the LCM 1 may copy a "child" in another MC 13. This scheme can permit production of any number of "children".

This "attack" can be dealt with by performing authentication at the time of transferring data between the MC 13 and the LCM 1. Specifically, supposing that the MC 13 does not accept data transfer from an illegitimate LCM 1 and the LCM 1 does not accept data transfer from an illegitimate MC 13, a "child" in the MC 13 cannot be saved in a separate recording medium. It is also impossible to make an unauthorized checkin. The above "attack" can therefore be avoided.

Actually, however, checkin/checkout cannot be accomplished even on the premise that authentication between the LCM 1 and the MC 13 is made because the following "attack" is possible. First, with no "child" produced from a "parent" on the LCM 1, data on the LCM 1 (particularly, information in the license storage section 9) is backed up in a separate storage medium. After a "child" is copied in the MC 13, the backed-up data of the LCM 1 is restored. Because the "parent" on the LCM 1 returns to the state of before the production of the "child", it is possible to produce a "child" in another MC 13. Any number of "children" can be created this way.

Figure 21:
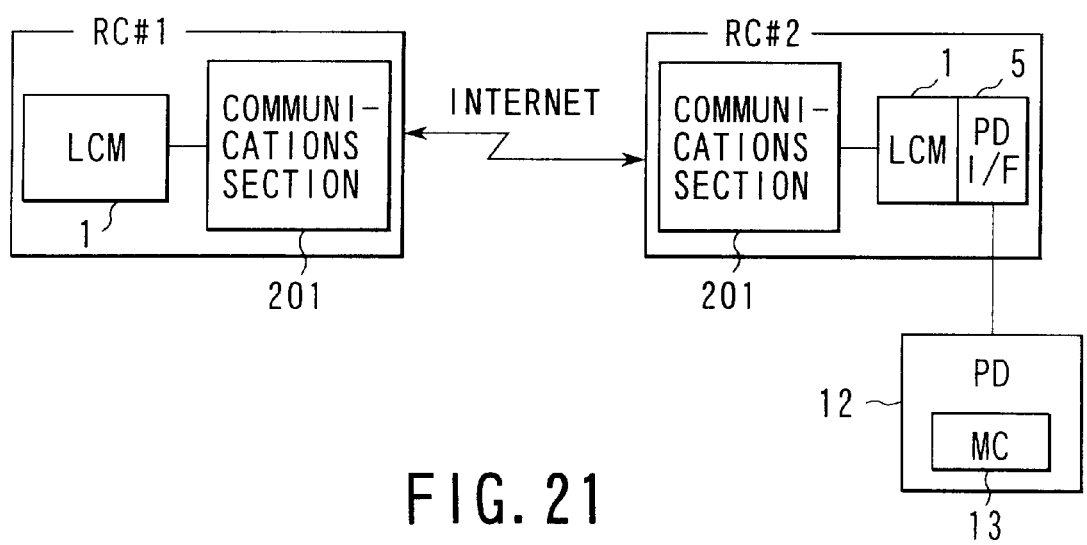
FIG. 21 is a diagram exemplifying the architecture of a system in the case where copied contents are recorded on a storage medium over a network.

A description will now be given of a problem other than those which arise in accomplishing checkin/checkout. This problem is concerned with recording to the MC 13 over a predetermined communications path such as the Internet. The Internet distribution authorized by an EMD is the legitimate distribution that is made upon permission by a copyright owner and thus raises no problem. But, contents may be recorded in the MC 13 via the Internet in the manner that is illustrated in FIG. 21. A communications section 201 on a personal computer (PC) in FIG. 21 is merely relaying a write protocol to the MC 13. The LCM 1 cannot distinguish the PD 12 that is directly connected to the PC #2 which is activated by this LCM 1 from a PD 12 connected to the PC #2 that is activated by an LCM 1 which is remotely connected via the communications section 201. This makes it possible to carry out (illegitimate) distribution of contents via a network such as the Internet.

Means or the like for regulating checkin/checkout and the recording of contents into the MC 13 over a network, which is subject matter of the present invention, will now be described in order of the items listed below.

1. Checkin/Checkout
(1-1) Checkin/checkout
(1-2) Checkin/checkout of Copied Contents Using MC of Level 2
(1-3) Guest Book-oriented Management of Copied Contents
(1-4) Playback of Copied Contents Stored in MC of Level 1
(1-5) Checkin/checkout of Copied Contents and Playback of Copied Contents Using MC of Level 1
(1-6) Checkin/checkout of Copied Contents and Playback of Copied Contents Using MC of Level 0
2. Means for Regulating Recording of Copied Contents in MC over Network
3. Secret Area (Checkin/Checkout)

Figure 2:
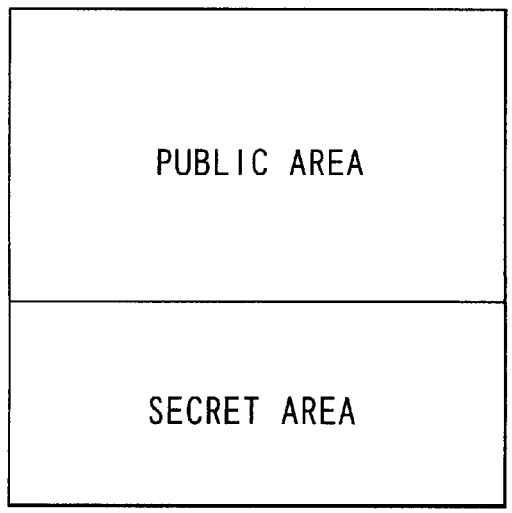
FIG. 2 is a diagram showing one example of the structure of a memory area.

To accomplish checkin/checkout, an area (secret area) which cannot be read or written with known procedures is provided in the memory area in the MC 13 and information needed to decrypt contents is recorded in the secret area (see FIG. 2). In addition, an area (secret area) which can be accessed only with secret procedures is provided in the memory area in the LCM 1 (e.g., a hard disk (HDD) when the LCM 1 is constructed by a PC) and a guest book to be described later is stored in the secret area (see FIG. 2). Further, an area (secret area) which can be accessed only with secret procedures may be provided in the memory area in the PD 12 so that information needed to decrypt contents is recorded there (see FIG. 2). In the following description, an area which is other than secret areas and is accessible by ordinary procedures is called "public area".

As shown in FIG. 1, The LCM 1 has a guest book storage section 8 provided in the secret area and a secret-area driver 7 for reading data from the secret area after the SMS 2 carries out secret specific procedures for accessing the guest book storage section 8.

Figure 4A:
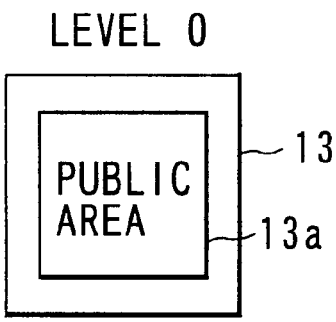
FIGS. 4A to 4C are diagrams for explaining the characteristics of three types of storage media.
Figure 4B:
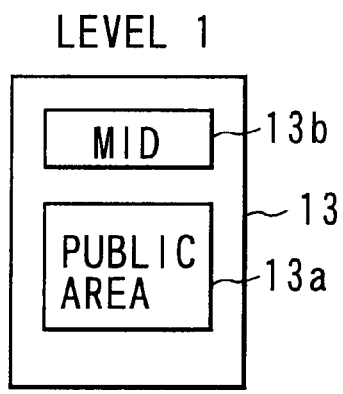
Figure 4C:
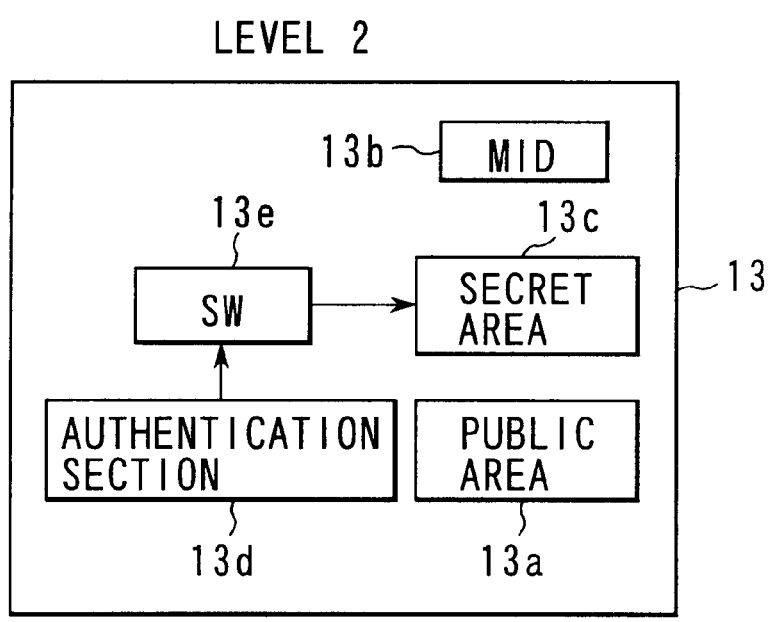

As shown in FIG. 4C, the MC 13 includes an ID-information storage section 13b which is designed to be externally unwritable and uncopyable and stores its ID information MID, a secret area 13c, a public area 13a and a switch (SW) 13e which opens the gate so as to be accessible to the secret area 13c only when an authentication section 13d, which carries out authentication every time the secret area 13c is accessed, determines that the accessing side is the legitimate. There are three types of MCs 13 usable in this embodiment. The type of the MC 13 which has both ID information MID and a secret area, as shown in FIG. 4C, is called "level 2". The type of the MC 13 which does not have a secret area but ID information MID, as shown in FIG. 4B, is called "level 1".

The type of the MC 13 which has neither ID information MID nor a secret area, as shown in FIG. 4C, is called "level 0". Level 0 can be distinguished from the other types depending on whether or not the MC 13 has ID information MID. Further, level 1 and level 2 can be distinguished from each other based on the structure of the ID information MID. For example, when ID information is a series of values, it is level 2 if the value is equal to or greater than a predetermined value.

The following description will be given of the MC 13 of level 2 unless otherwise specified.

This MC 13 may be loaded either into the PD 12 connected to the LCM 1 or into the LCM 1 directly.

Figure 3:
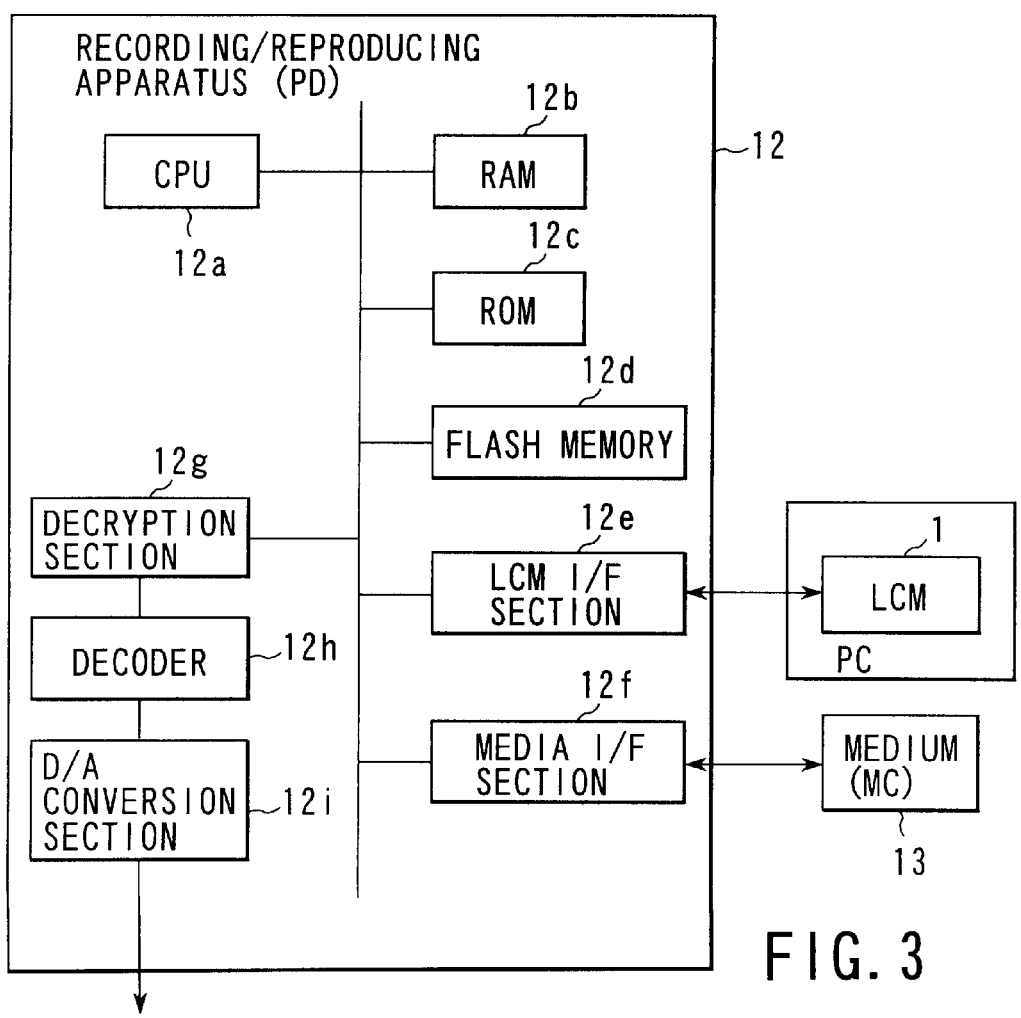
FIG. 3 is a diagram exemplifying the internal structure of a recording/reproducing apparatus (PD)

FIG. 3 exemplifies the structure of the PD 12 in which example the MC 13 is loaded in the a media interface (I/F) section 12f. In the case where the LCM 1 reads or writes data to the MC 13 via the PD 12, the secret area in the MC 13 is accessed via a secret-area accessing section in the PD 12. The media I/F section 12f has the secret-area accessing section for accessing the secret area in the MC 13. The secret area in the PD 12 may be provided in a flash memory 12d. Written in a ROM 12c are a program for carrying out mutual authentication with the MC 13 and a program for discriminating the type of the MC 13. Those programs carry out processes, such as mutual authentication between the PD 12 and the MC 13 and discrimination of the type of the MC 13, under the control of a CPU 12a.

Figure 5:
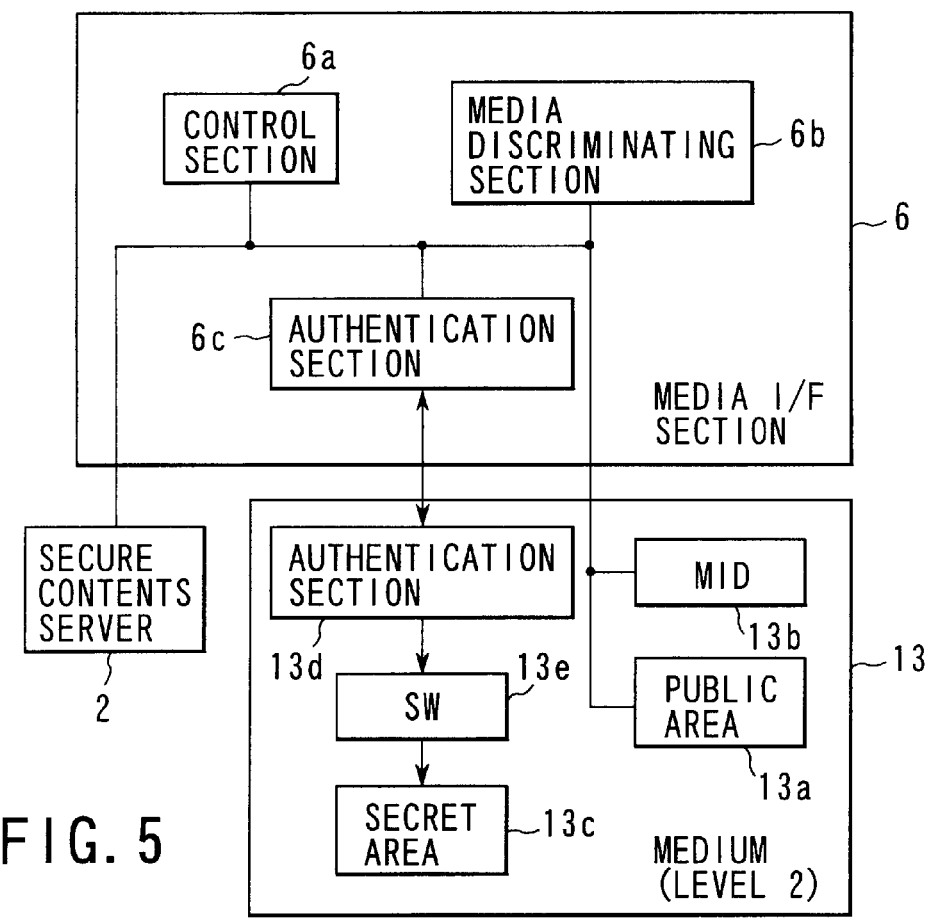
FIG. 5 is a diagram exemplifying the internal structure of a media interface (I/F) section.

FIG. 5 shows the structure of the media I/F section 6, which comprises an authentication section 6c which performs mutual authentication with the MC 13, a media discriminating section 6b which discriminates the type of the MC 13, and a control section 6a which performs the general control of the former two sections. The authentication section 6c is a secret-area accessing section for accessing to the secret area in the MC 13.

The guest book which is stored in the secret area in the LCM 1 will now be discussed.

Every music content that is held in the SMS 2 has a content ID (TID) which is ID information to identify that music content and a predetermined number of copyable contents or the number of remaining children and a checkout list as attribute information. This attribute information is referred to as a guest book. The guest book is recorded in the guest book storage section 8 provided in the secret area in the form as illustrated in FIG. 7A.

Figures 7A, 7B, 7C:
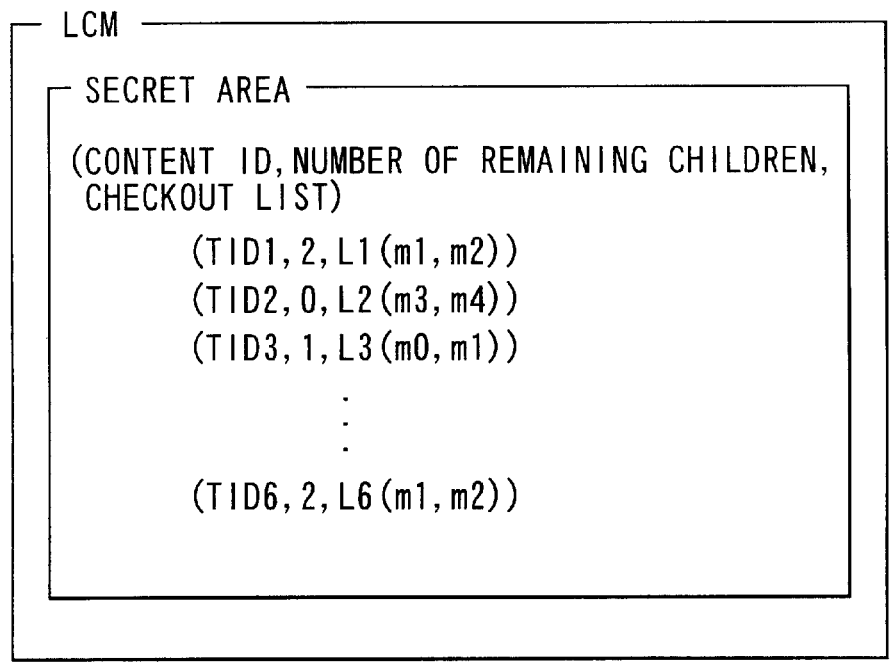
FIGS. 7A to 7C are diagrams showing a storage example of a guest book stored in a secret area in the LCM.

In FIG. 7A, the number of remaining children of, for example, a content ID "TID1" is "2" and its checkout list is L1.

The checkout list is a list of ID information of the MC 13 which has recorded copied contents (children). In FIG. 7A, for example, it is apparent from the checkout list L1 that children of the content which has the content ID "TID1" have checked out from two MCs 13 having ID information of "m1" and "m2".

(Checkin/Checkout of Copied Contents Using MC of Level 2)

Next, checkin/checkout using the MC 13 of level 2 which has the structure as shown in FIG. 4C will be discussed with reference to FIGS. 9 to 11.

Figure 9:
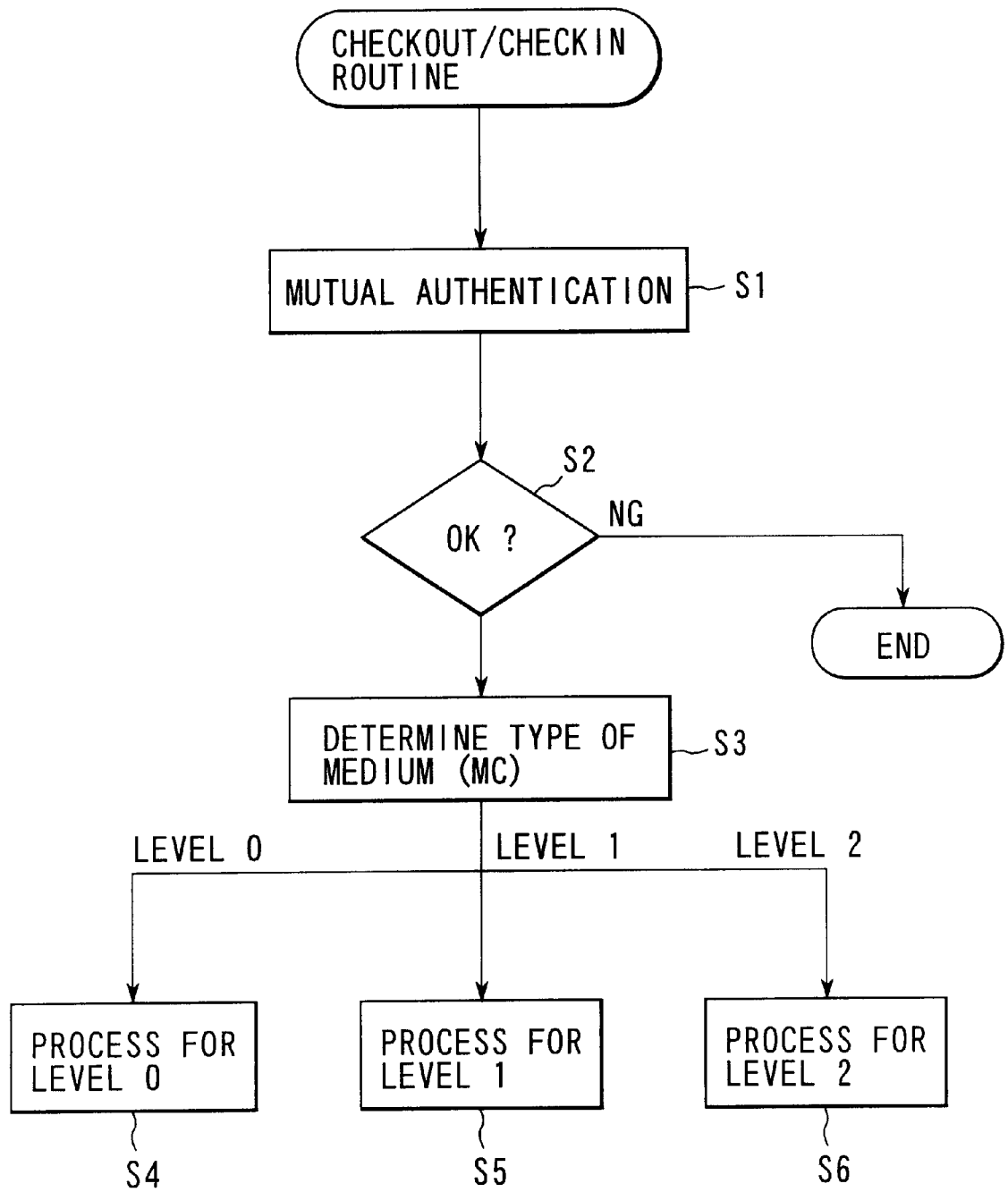
FIG. 9 is a flowchart for explaining a checkin/checkout routine, illustrating procedures from the determination of the type of a storage medium to the selection of a process according to that type.

When the MC 13 is loaded into the media I/F section 6 of the LCM 1 or into the PD 12, mutual authentication is carried out between the media I/F section 6 and the MC 13 or between the PD 12 and the MC 13 (step S1 in FIG. 9). When both sections have determined that the other is legitimate (step S2), the media I/F section 6 or the PD 12 discriminates the type of the MC 13 based on the ID information MID read from the MC 13 (step S3). As the type of the MC 13 is level 2 here, the media I/F section 6 or the PD 12 carries out a checkin/checkout routine according to that type (step S6).

Figure 10:
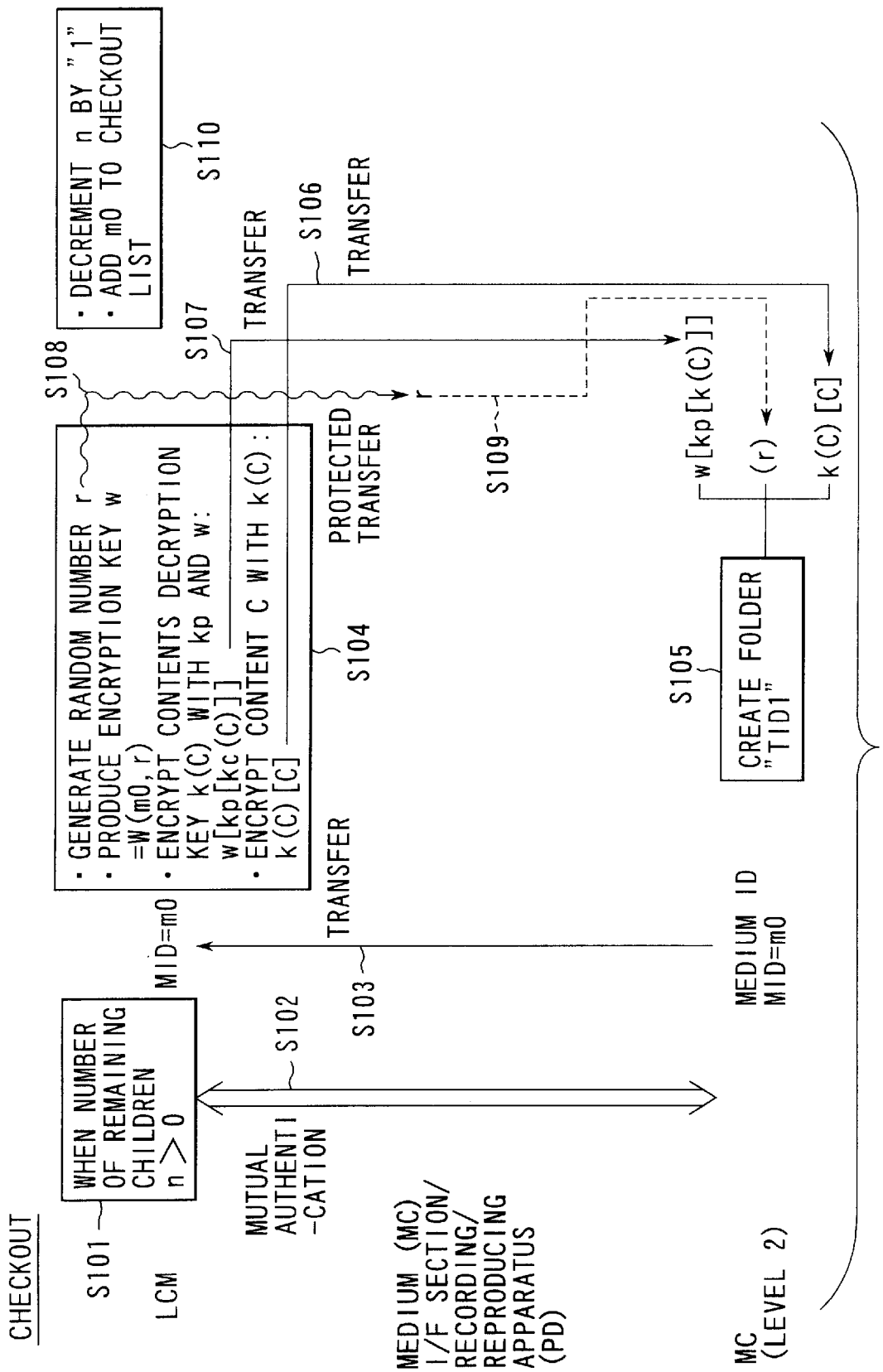
FIG. 10 is a diagram for explaining checkout procedures when the type of the storage medium is level 2.

Referring to FIG. 10, a description will now be given of the case where a checkout instruction is given to the SMS 2 via a user interface (I/F) section 15 of the LCM 1 or via the PD 12. The SMS 2 checks the number of remaining children, n, of a content (e.g., the one whose content ID is "TID1") for which a request for checkout from the guest book has been made (step S101). When n>0, the SMS 2 performs mutual authentication with the MC 13 if needed (step S102). When their legitimacy is mutually verified, the SMS 2 asks the MC 13 to transfer its ID information MID (e.g., MID=m0) (step S103).

The SMS 2 generates a random number r and generates an encryption key w using this random number r, the ID information m0 of the MC 13 and a key generating algorithm W that the legitimate MC 13 and the LCM 1 share. The key generating algorithm W uses two arguments (r and m0 in this example) and serves to change the encryption key w each time. The SMS 2 further encrypts a contents decryption key K(C) for decrypting the encrypted content using both an encryption key Kp, which the MC 13 and the LCM 1 share, and the previously generated encryption key w. This contents decryption key is expressed by w[Kp[K(C)]]. The SMS 2 also encrypts a content C with a key K(C). The encrypted content is expressed by K(C)[C] (step S104).

After making a folder having the name of "TID1", for example, in the memory area in the MC 13 (step S105), the SMS 2 writes the encrypted content K(C)[C] and the encrypted contents decryption key w[Kp[K(C)]] in the public area in that folder (steps S106 and S107).

Then, the SMS 2 performs mutual authentication with the MC 13 in order to access the secret area 13c of the MC 13, and writes the random number r in an area corresponding to the folder "TID1" in the secret area 13c when the gate to the secret area 13c is opened as a result of their legitimacy being mutually verified (steps S108 to S109). When this process is completed, the gate that has enabled access to the secret area 13c is closed by the switch 13e. It is desirable that the route up to the transfer of the random number r to the secret area 13c in step S108 be protected by carrying out a process, such as encrypting the random number r.

Finally, the SMS 2 subtracts "1" from the number of remaining children n of the content having the content ID of "TID1" for which the request for checkout from the guest book has been made and adds the ID information "m0" of the MC 13 to the checkout list L1 as shown in FIG. 7B (step S110).

Figure 6:
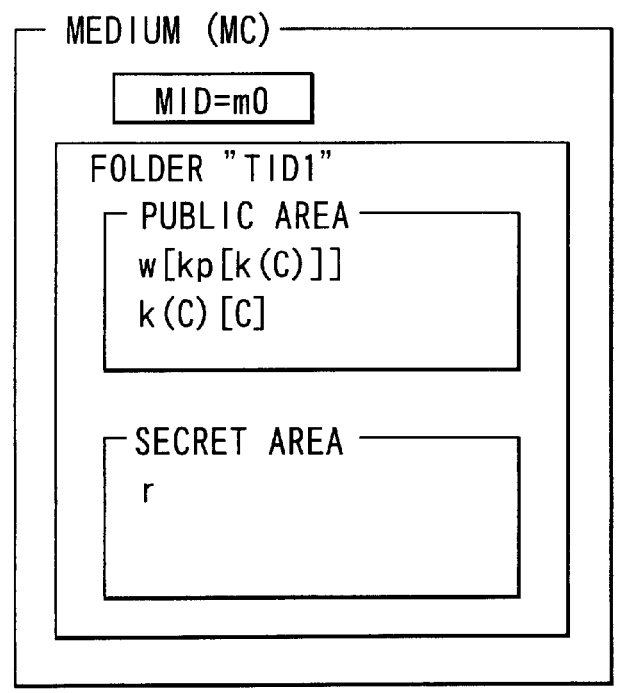
FIG. 6 is a diagram for explaining the recorded contents on a storage medium after checkin.

FIG. 6 shows the recorded contents on the MC 13 when the above-described routine is completed.

Figure 11:
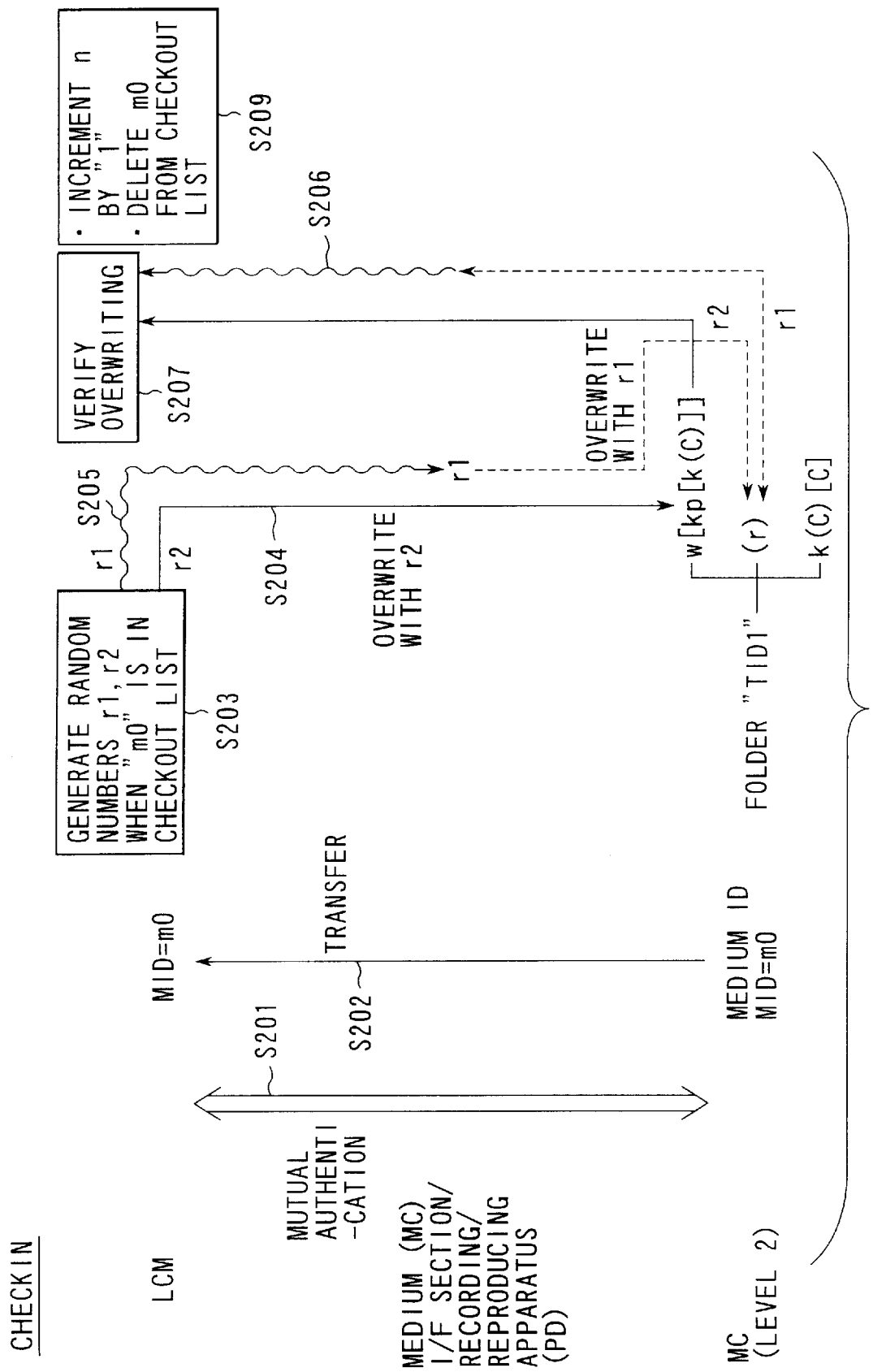
FIG. 11 is a diagram for explaining checkin procedures when the type of the storage medium is level 2.

Referring to FIG. 11, a description will now be given of the case where a checkin instruction is given to the SMS 2 via the user I/F section 15 of the LCM 1 or via the PD 12.

The SMS 2 performs mutual authentication with the MC 13 if needed (step S201). When their legitimacy is mutually verified, the SMS 2 asks the MC 13 to transfer its ID information MID (e.g., MID=m0) (step S202).

The SMS 2 generates random numbers r1 and r2 when the ID information of the MC 13, i.e., "m0", is registered in the checkout list in the guest book of the content whose checkin request has been made (e.g., the content has the content ID of "TID1") (step S203). Then, the SMS 2 overwrites information stored in the area that corresponds to the folder of this content (folder "TID1" in this example) in the public area 13a of the MC 13 with the random number r2 to erase it (step S204). The SMS 2 also performs mutual authentication with the MC 13 in order to access the secret area 13c of the MC 13, and overwrites information in the area that corresponds to the folder "TID1" in the secret area 13c of the MC 13 with the random number r1 to erase it (step S205). When this process is completed, the gate that has enabled access to the secret area 13c is closed by the switch 13e. It is desirable that the route up to the transfer of the random number r1 to the secret area 13c in step S205 be protected by carrying out a process, such as encrypting the random number r1.

Thereafter, the SMS 2 asks the MC 13 to transfer the values of the individual areas after overwriting to verify the overwriting-oriented erasure (step S206) and checks if the values respectively match with the random numbers r1 and r2 (step S207). When verifying the overwriting-oriented erasure, the SMS 2 erases the folder "TID1" from the MC 13 (step S208).

Finally, as shown in FIG. 7C, the SMS 2 adds "1" to the number of remaining children n of the content having the content ID of "TID1" for which the request for checking in the guest book has been made and deletes the ID information "m0" of the MC 13 from the checkout list L1 (step S209).

The random number r recorded in the secret area 13c in the MC 13 cannot be saved in a separate storage medium (because no authentication-oriented legitimacy can be confirmed). After the content having the ID information of "TID1" checks in, therefore, the content restored in the MC 13 cannot be used. The guest book that is stored in the secret area in the LCM 1 cannot be saved in a separate recording medium (because no authentication-oriented legitimacy can be confirmed). After the content having the ID information of "TID1" checks out, therefore, the guest book cannot be set back to the state of before the checkout. Apparent from the above, the present invention provides an adequate countermeasure against the aforementioned attack.

At the time of making checkin, from the viewpoint of security, it is important to overwrite the contents of the secret area in the MC 13 with a random number. It is only the legitimate SMS 2 that can write data in the secret area in the MC 13. In other words, the legitimate SMS 12 always writes data in the secret area by taking security procedures. The legitimacy of the MC 13 is guaranteed if writing through the security procedures succeeds. That is, it is possible to prevent an illegitimate checkin. To enhance the security, the SMS 2 overwrites the information in the secret area with a random number, then reads the contents of the secret area (through the security procedures) and checks if the contents are the overwritten random number.

(Guest Book-Oriented Management of Copied Contents)

Figures 8A, 8B:
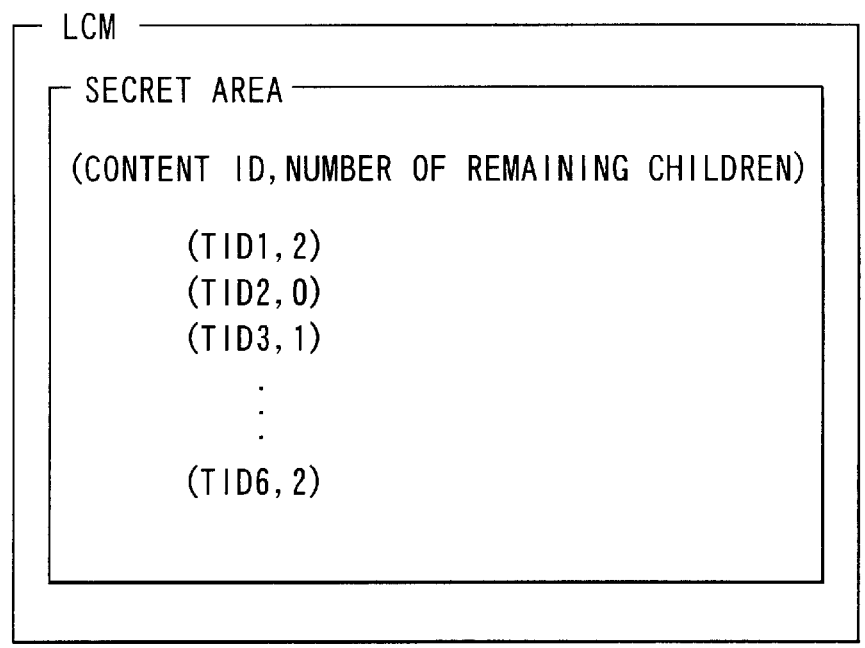
FIGS. 8A and 8B are diagrams showing another storage example of the guest book stored in the secret area in the LCM.

The SMS 2 may check in a content whose title (content ID) is not listed in the guest book. Alternatively, the SMS 2 may allow checkin from a MC 13 which is not listed in the checkout list. In this case, the guest book does not have a checkout list of the individual contents. This is because the checkout list is to be referred to for the purpose of preventing checkin from an "innocent" MC 13. FIG. 8A shows the stored contents of the guest book in this case.

As shown in FIG. 8A, the guest book of the individual contents has only the content ID of each content and the number of remaining children of that content registered therein.

Let us consider a case where a content having a content ID of "TID7" checks in from the MC 13 which has the ID information MID=m0. That is, a content whose content ID is "TID7" and which has checked out from a separate SMS 2 is currently stored in the form as shown in FIG. 6 in this MC 13.

The LCM 1 erases the stored contents of the secret area and public area in the MC 13 and deletes the folder "TID7" without going over step S203 of referring to the checkout list in the procedures illustrated in FIG. 11. Then, registration of a new content (TID7, 1) is made into the guest book.

If the LCM 1 checks in a content which is not listed in the guest book, the following event, for example, becomes possible. Suppose that a "parent" content the LCM 1 which is constructed by a home PC stores can have two "children". The LCM 1 checks out one "child" from the home PC with respect to the MC 13 and checks it in to a friend's PC. This means that the "parent" the LCM 1 purchased has reduced the number of producible "children" and has presented a content to the friend.

If the LCM 1 is allowed to check in a content which is not listed in the guest book, it is apparently possible to "move" a "child" content via the LCM 1. While this function is convenient to users, it also provides an opportunity to develop the market of secondhand goods. Actually, the following transaction of used contents can take place. A user purchases a new content from one EMD and checks this content in the LCM 1 of a used-data dealer after a short period of usage. At this time, this user can receive money for the content. The used-data dealer sells the data to another person who wants it at a price cheaper than the normal price at the EMD.

The establishment of a "secondhand market" where the copyright of contents cannot be controlled is not desirable to copyright holders. To allow each copyright holder to control the checkin to different LCMs 1, therefore, each content may be provided with a checkout attribute flag f.

Figure 18A:
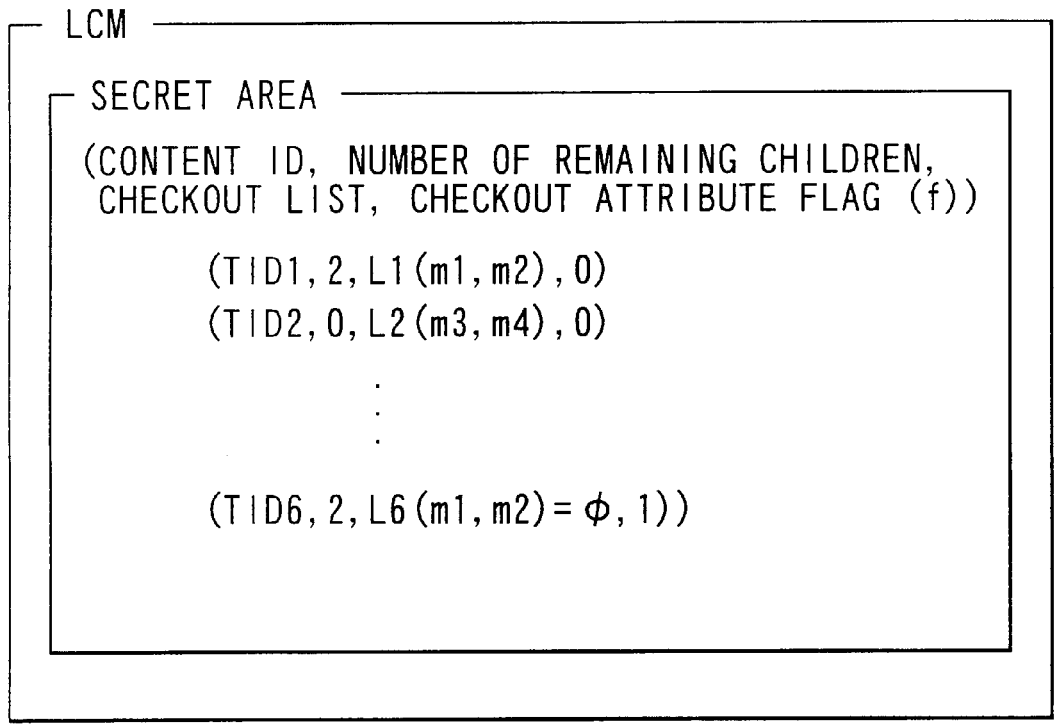
FIGS. 18A to 18C are diagrams showing a further storage example of the guest book which is stored in the secret area in the LCM and includes a flag.

FIG. 18A shows the form of the guest book the LCM 1 has in this case.

As shown in FIG. 18A, the guest book of the individual contents has the content ID, the number of remaining children, the checkout list and the checkout attribute flag f of each content registered therein.

When the flag f is "1", the associated content can check out from and check in another LCM 1. When the flag f is "0", however, the associated content cannot at least check in another LCM 1.

Figure 18B:
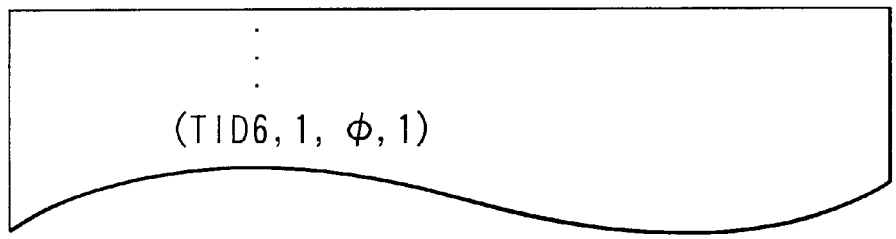
Figure 18C:
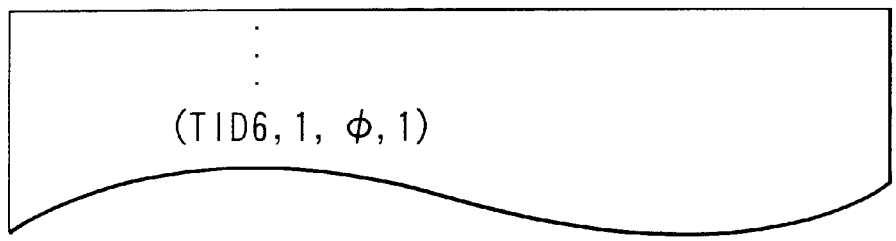

Let us consider a case where a content having a content ID of "TID6" checks out. First, the SMS 2 checks the guest book and confirms that the checkout attribute flag of this content is "1". In this example, it is assumed that with the flag value being "0", the LCM 1 does not check out the content. When the flag f is "1", the number of remaining children with the content ID of "TID6" in the guest book is decremented by "1" by the same procedures as illustrated in FIG. 10, so that this number becomes "1" (see FIG. 18B). It is to be noted that a checkout list L6 is empty (denoted by "φ") and what is more, the flag f is "1" which allows the associated content to check in an LCM 1 provided on another PC. The guest book need not therefore have a checkout list. It is also to be noted that the flag f is recorded together with the random number r in the secret area in the MC 13.

Figure 19:
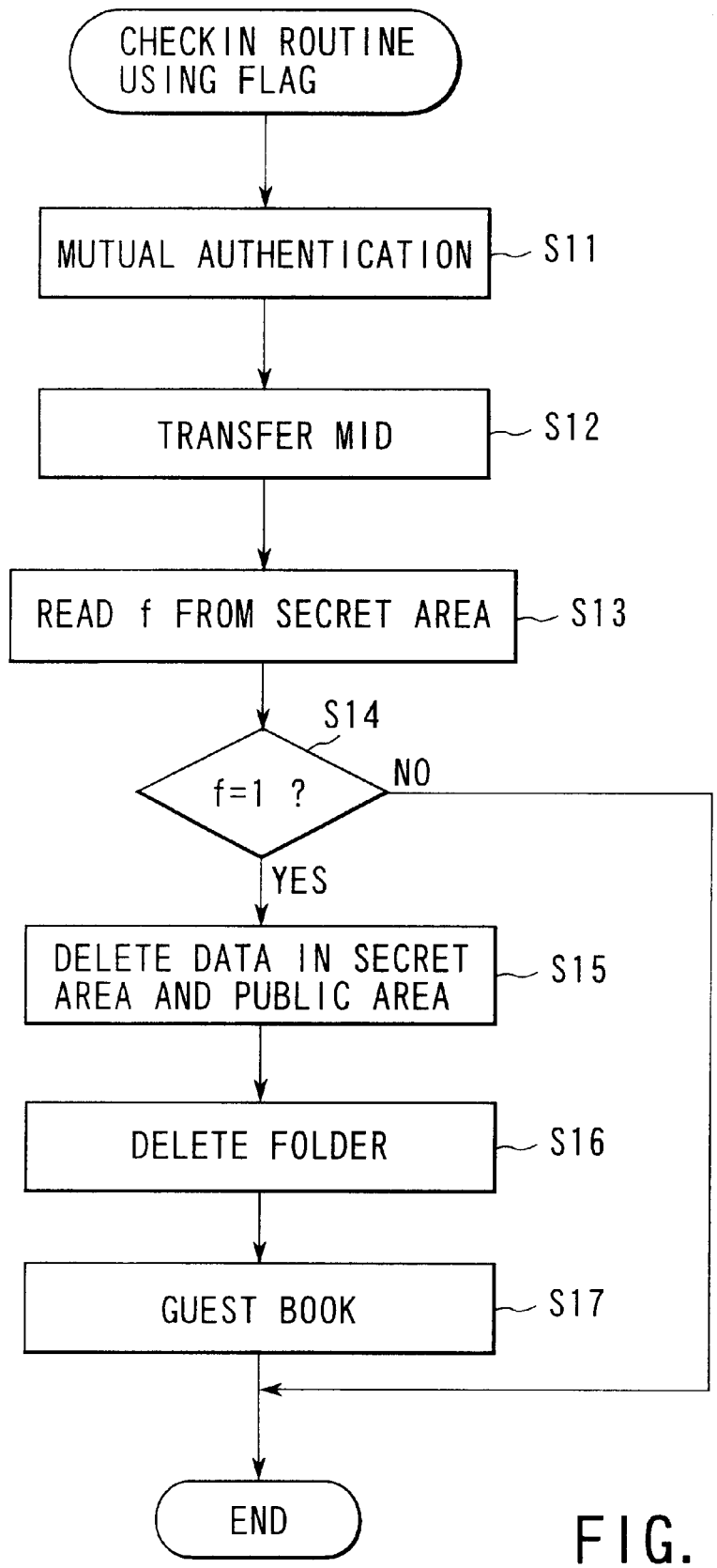
FIG. 19 is a flowchart for schematically explaining a checkin routine using a flag.

Referring now to the flowchart shown in FIG. 19, a description will be given of the case where the content having the content ID of "TID6" checks in the same LCM 1 from which it has checked out or checks in another LCM 1.

Through the procedures illustrated in FIG. 11, mutual authentication is carried out between the MC 13 and the LCM 1 (step S11) to acquire the ID information MID of the MC 13 (step S12).

Regardless of whether or not the content whose checkin request has been made is registered in the guest book, the SMS 2 carries out the above-described security procedures on the secret area 13c in the MC 13 (the gate to the secret area 13c is opened after mutual authentication with the MC 13 is performed and their legitimacy is verified) to read the flag f from the secret area 13c (step S13). When the flag f is "1" (step S14), the SMS 2 executes steps S204 to S208 in FIG. 11 (steps S15 to S16). When the flag f is "0", the SMS 2 terminates the routine. Finally, when the content is not registered in the guest book, new registration (TID6, 1, φ, 1) with the number of remaining children of that content being set to "1" is made in the guest book, whereas when the content is registered in the guest book, the number of remaining children of that content is incremented by "1" (step S17).

(Playback of Copied Contents Stored in MC of Level 1)

Figure 12:
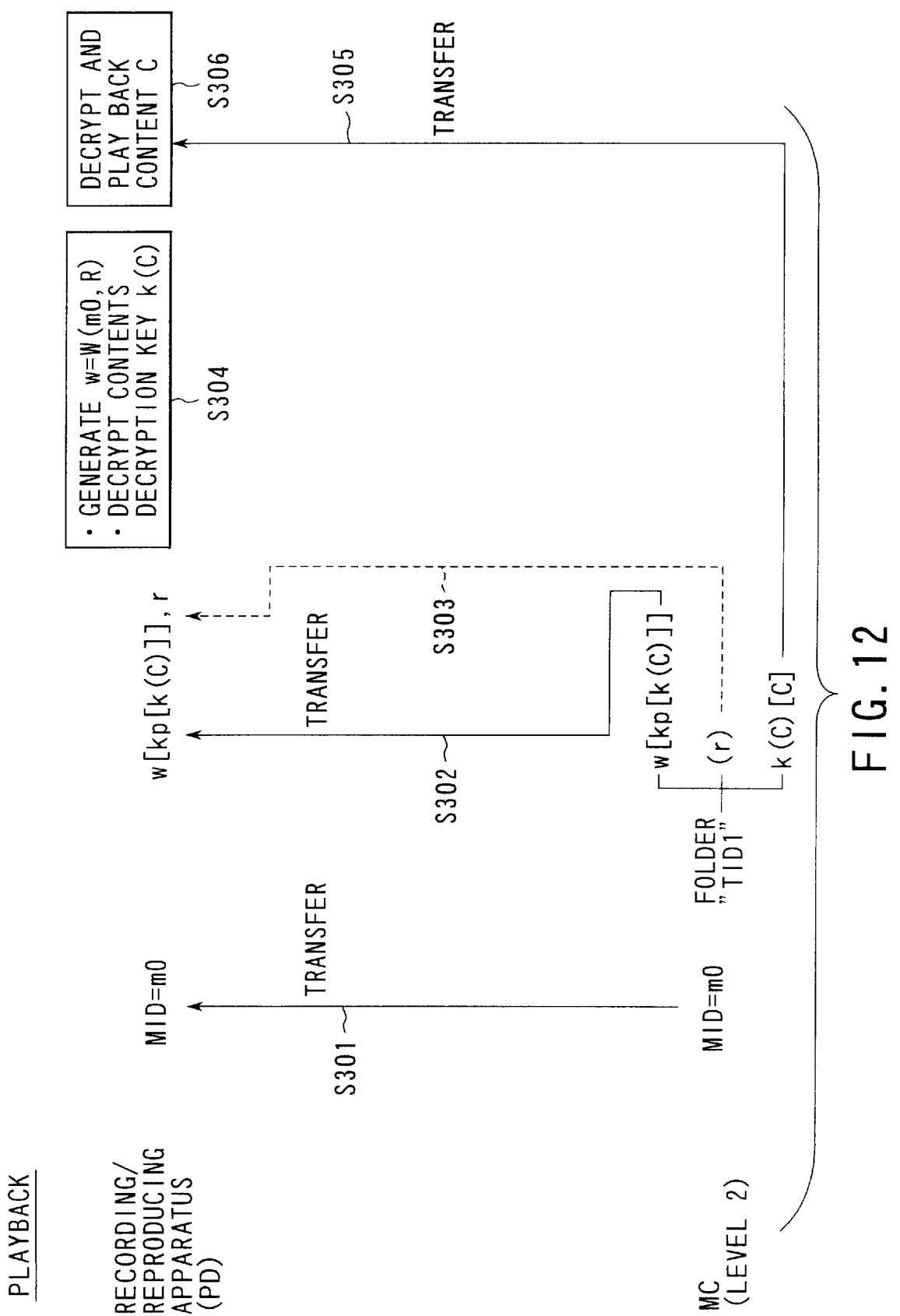
FIG. 12 is a diagram for explaining playback procedures when the type of the storage medium is level 2.

Referring now to FIG. 12, a description will be given of how to play back a copied content stored in the MC 13 of level 2 which has the structure as shown in FIG. 4C. When the MC 13 is loaded into the PD 12, the PD 12 asks the MC 13 to transfer its ID information MID (e.g., MID=m0) (step S301). At this time, the type of the MC 13 can be discriminated to be level 2 based on the ID information MID=m0. Accordingly, the PD 12 reads out w[Kp[K(C)]] from the secret area in the MC 13 (step S302). The PD 12 then performs mutual authentication with the MC 13 to access the secret area 13c of the MC 13, and reads a random number r from an area corresponding to the folder "TID1" in the secret area 13c when the gate to the secret area 13c is opened as a result of their legitimacy being mutually verified (step S303). When this process is completed, the gate that has enabled access to the secret area 13c is closed by the switch 13e.

The PD 12 generates an encryption key w using the ID information "m0" of the MC 13 and the key generating algorithm W that the legitimate MC 13 and the PD 12 share. The PD 12 decrypts a contents decryption key K(C) from the encryption key w, the encryption key Kp that the MC 13 and LCM 1 share, and w[Kp[K(C)]] read from the MC 13 (step S304).

Then, the PD 12 reads an encrypted content K(C)[C] from the public area in the MC 13 (step S305), decrypts the content C in a decryption section 12g, decodes the decrypted content in a decoder 12h, converts the resultant digital signal to an analog signal in a D/A conversion section 12i and plays back the music piece (step S306).

(Checkin/Checkout of Copied Contents and Playback of Copied Contents Using MC of Level 1)

Figure 13:
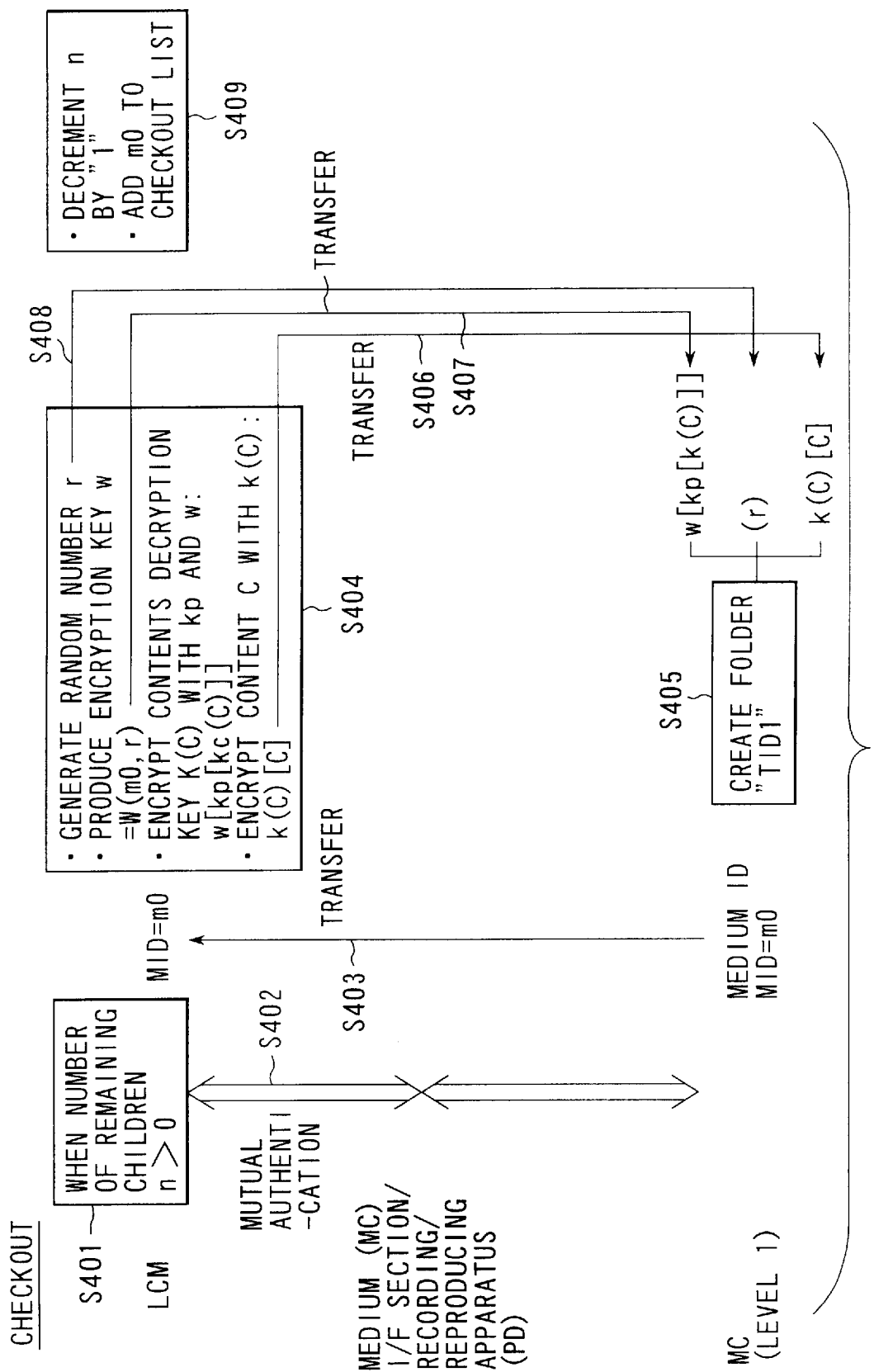
FIG. 13 is a diagram for explaining checkout procedures when the type of the storage medium is level 1.

Referring now to FIGS. 9 and 13, a description will be given of checkin/checkout using the MC 13 of level 2 which has the structure as shown in FIG. 4B. It is to be noted that the MC 13 of level 1 has no secret area and cannot therefore make checkin.

The sequence of procedures from the point when the MC 13 is loaded into the media I/F section 6 of the LCM 1 or into the PD 12 up to the discrimination of the type of the MC 13 are the same as those in FIG. 9.

As the type of the MC 13 is level 1 here, the media I/F section 6 or the PD 12 carries out a checkin/checkout routine according to that type (step S5).

When an checkin instruction has been made to the SMS 2 via the user I/F section 15 of the LCM 1 or via the PD 12, this instruction is rejected as the type of the MC 13 has been discriminated as level 1.

Referring now to FIG. 13, a description will be given of the case where a checkout instruction is given to the SMS 2 via the user I/F section 15 of the LCM 1 or via the PD 12.

The SMS 2 checks the number of remaining children, n, of a content (e.g., the one whose content ID is "TID1") for which a request for checkout from the guest book has been made (step S401). When n>0, the SMS 2 performs mutual authentication with the MC 13 if needed (step S402). When their legitimacy is mutually verified, the SMS 2 asks the MC 13 to transfer its ID information MID (e.g., MID=m0) (step S403).

As in the case of level 2, the SMS 2 carries out generation of a random number r, generation of an encryption key w, encryption of a content key using the keys w and Kp and encryption of a content C (step S404), and then creates a folder whose name is "TID1", for example, in the memory area (only the public area in this example) in the MC 13 (step S405). Then, the SMS 2 writes the encrypted content K(C) [C], the encrypted contents decryption key w[Kp[K(C)]] and the random number r in this folder (steps S406 to S408).

Finally, the SMS 2 subtracts "1" from the number of remaining children n of the content having the content ID of "TID1" for which the request for checkout from the guest book has been made and adds the ID information "m0" of the MC 13 to the checkout list L1 as shown in FIG. 7B (step S409).

Figure 14:
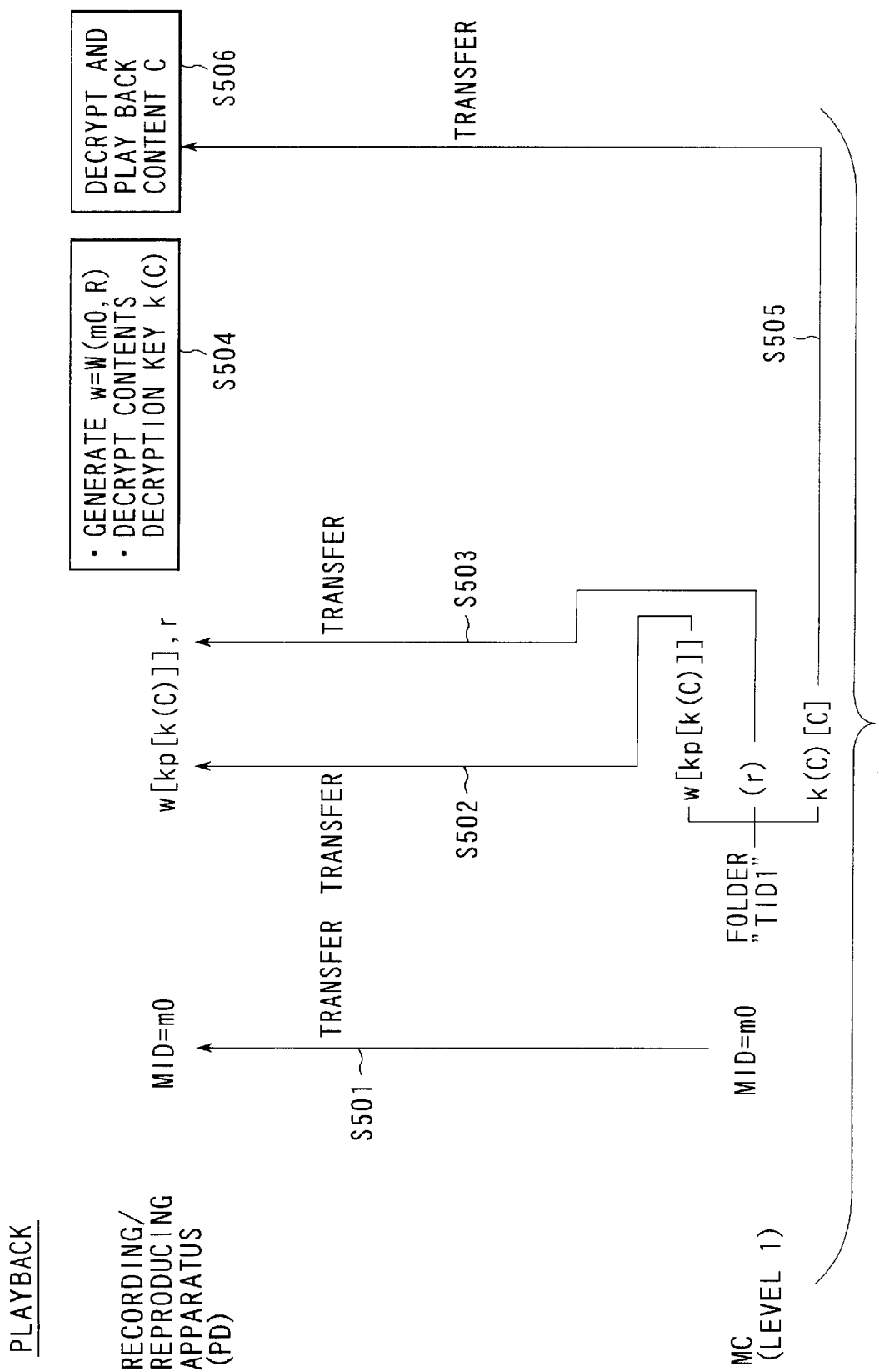
FIG. 14 is a diagram for explaining playback procedures when the type of the storage medium is level 1.

Referring now to FIG. 14, a description will be given of how to play back a copied content stored in the MC 13 of level 1. When the MC 13 is loaded into the PD 12, the PD 12 asks the MC 13 to transfer its ID information MID (e.g., MID=m0) (step S501). At this time, the type of the MC 13 can be discriminated to be level 1 based on the ID information MID=m0. Accordingly, the PD 12 reads out w[Kp[K(C)]] and the random number r from the memory area (only the public area) in the MC 13 (steps S502 to S503), and generates an encryption key w using the random number r, the ID information "m0" of the MC 13 and the key generating algorithm W that the legitimate MC 13 and the PD 12 share. The PD 12 decrypts a contents decryption key K(C) from the encryption key w, the encryption key Kp that the MC 13 and LCM 1 share, and w[Kp[K(C)]] read from the MC 13 (step S504).

Then, the PD 12 reads an encrypted content K(C)[C] from the memory area (only the public area) in the MC 13 (step S505), decrypts the content C in the decryption section 12g, decodes the decrypted content in the decoder 12h, converts the resultant digital signal to an analog signal in the D/A conversion section 12i and plays back the music piece (step S506).

(Checkin/Checkout of Copied Contents and Playback of Copied Contents Using MC of Level 0)

Figure 15:
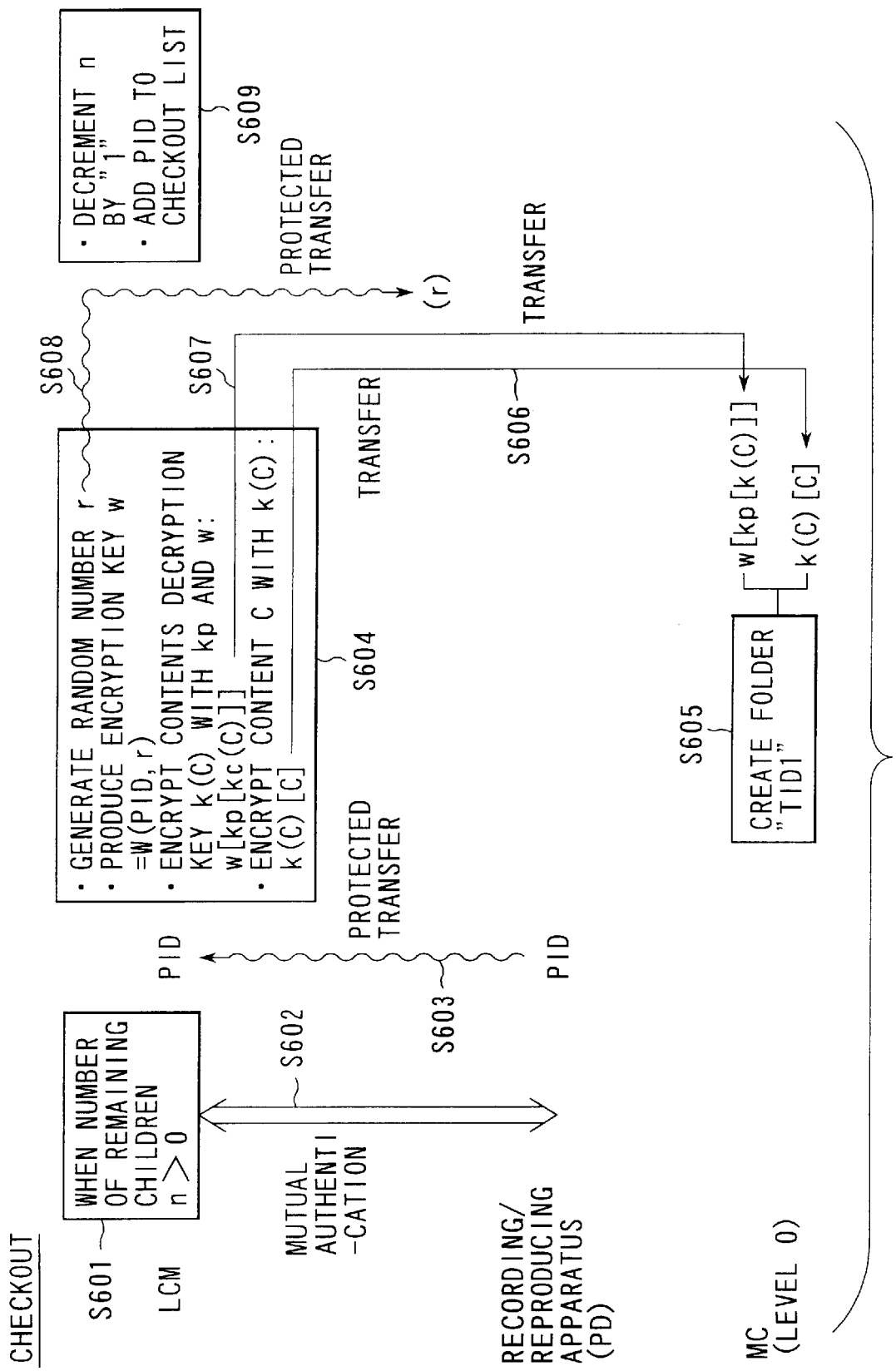
FIG. 15 is a diagram for explaining checkout procedures when the type of the storage medium is level 0.
Figure 16:
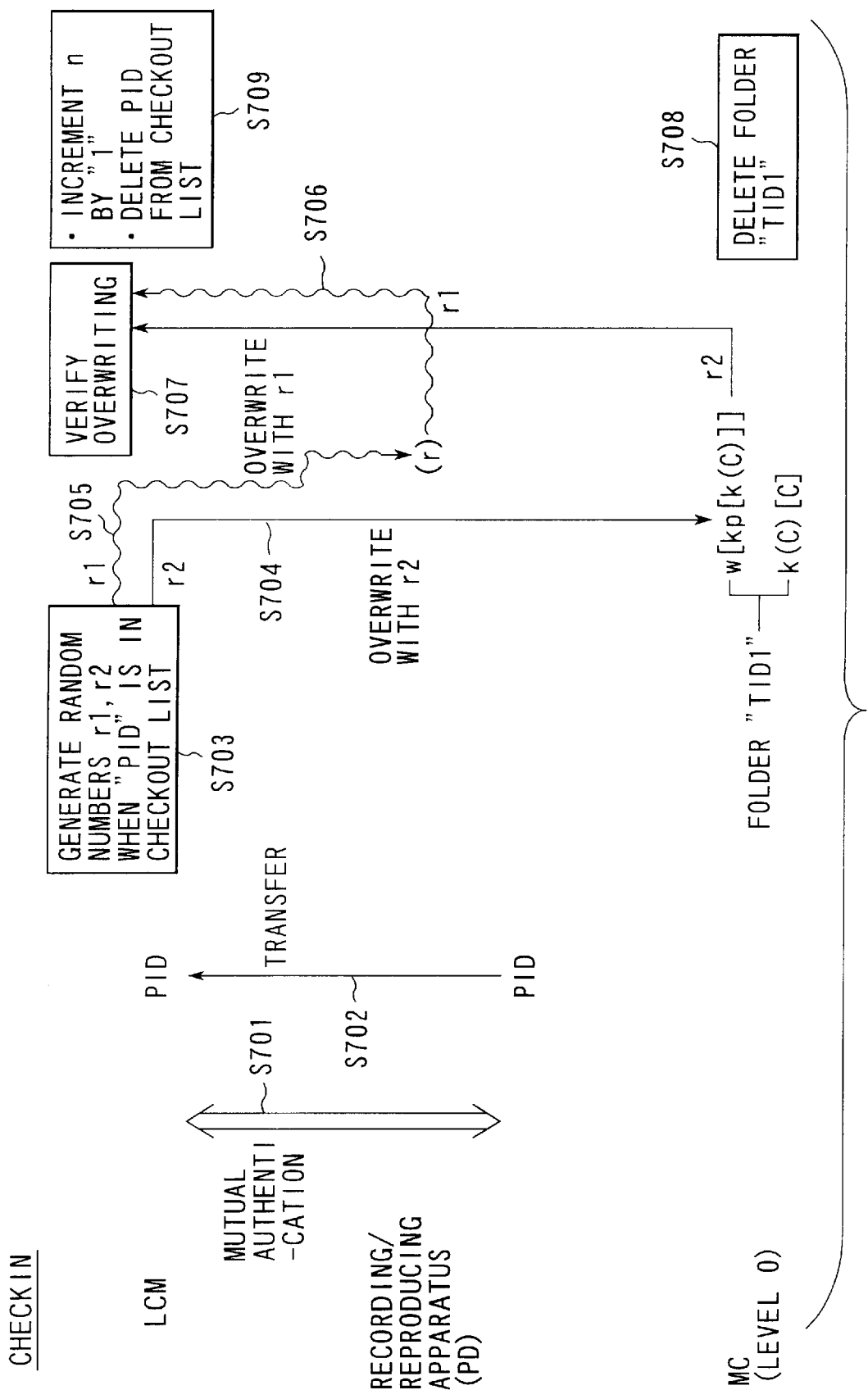
FIG. 16 is a diagram for explaining checkin procedures when the type of the storage medium is level 0.

Referring now to FIGS. 9, 15 and 16, a description will be given of checkin/checkout using the MC 13 of level 0 which has the structure as shown in FIG. 4A.

The MC 13 of level 0 cannot perform checkin/checkout and playback without using the PD 12. As this MC 13 does not have ID information MID, the ID information PID of the PD 12 is used instead in carrying out checkin/checkout.

The sequence of procedures from the point when the MC 13 is loaded into the PD 12 up to the discrimination of the type of the MC 13 are the same as those in FIG. 9.

As the type of the MC 13 is level 0 in this example, the PD 12 carries out a checkin/checkout routine according to that type (step S4).

Referring now to FIG. 15, a description will be given of the case where a checkout instruction is given to the SMS 2 via the PD 12.

The SMS 2 checks the number of remaining children, n, of a content (e.g., the one whose content ID is "TID1") for which a request for checkout from the guest book has been made (step S601). When n>0, the SMS 2 performs mutual authentication with the PD 12 (step S602). When their legitimacy is mutually verified, the SMS 2 asks the PD 12 to transfer its ID information PID (step S603).

As in the case of level 2, the SMS 2 carries out generation of a random number r, generation of an encryption key w, encryption of a content key using the keys w and Kp and encryption of a content C (step S604). It is to be noted that the two arguments the key generating algorithm W takes are r and PID.

Then, the SMS 2 creates a folder whose name is "TID1", for example, in the memory area (only the public area in this example) in the MC 13 (step S605). Then, the SMS 2 writes the encrypted content K(C)[C], the encrypted contents decryption key w[Kp[K(C)]] in this folder (steps S606 to S607).

The SMS 2 writes the random number r in the secret area in the PD 12 (step S608). It is desirable that the route up to the transfer of the random number r to the secret area of the PD 12 in step S608 be protected by carrying out a process, such as encrypting the random number r.

Finally, the SMS 2 subtracts "1" from the number of remaining children n of the content having the content ID of "TID1" for which the request for checkout from the guest book has been made and adds the ID information "PID" of the PD 12 to the checkout list L1 as shown in FIG. 7B (step S609).

Referring now to FIG. 16, a description will be given of the case where a checkin instruction is given to the SMS 2 via the PD 12.

The SMS 2 performs mutual authentication with the MC 13 (step S701). When their legitimacy is mutually verified, the SMS 2 asks the PD 12 to transfer its ID information PID (step S702).

The SMS 2 generates random numbers r1 and r2 when the ID information PID of the PD 12 is registered in the checkout list in the guest book of the content whose checkin request has been made (e.g., the content has the content ID of "TID1") (step S703). Then, the SMS 2 overwrites information stored in the area that corresponds to the folder of this content (folder "TID1" in this example) in the public area 13a of the MC 13 with the random number r2 to erase it (step S704). The SMS 2 also performs mutual authentication with the PD 12 in order to access the secret area of the PD 12, and overwrites information in the area that corresponds to the folder "TID1" in the secret area 13c with the random number r1 to erase it (step S705). When this process is completed, the gate that has enabled access to the secret area of the PD 12 is closed by the switch 13e. It is desirable that the route up to the transfer of the random number r1 to the secret area 13c in step S705 be protected by carrying out a process, such as encrypting the random number r1.

Thereafter, the SMS 2 asks the MC 13 to transfer the value after overwriting to verify the overwriting-oriented erasure or reads the value of this area after overwriting from the secret area of the PD 12 (step S706) and checks if the values respectively match with the random numbers r1 and r2 (step S707). When verifying the overwriting-oriented erasure, the SMS 2 erases the folder "TID1" from the MC 13 (step S708).

Finally, as shown in FIG. 7C, the SMS 2 adds "1" to the number of remaining children n of the content having the content ID of "TID1" for which the request for checking in the guest book has been made and deletes the ID information "PID" of the PD 12 from the checkout list L1 (step S709).

Figure 17:
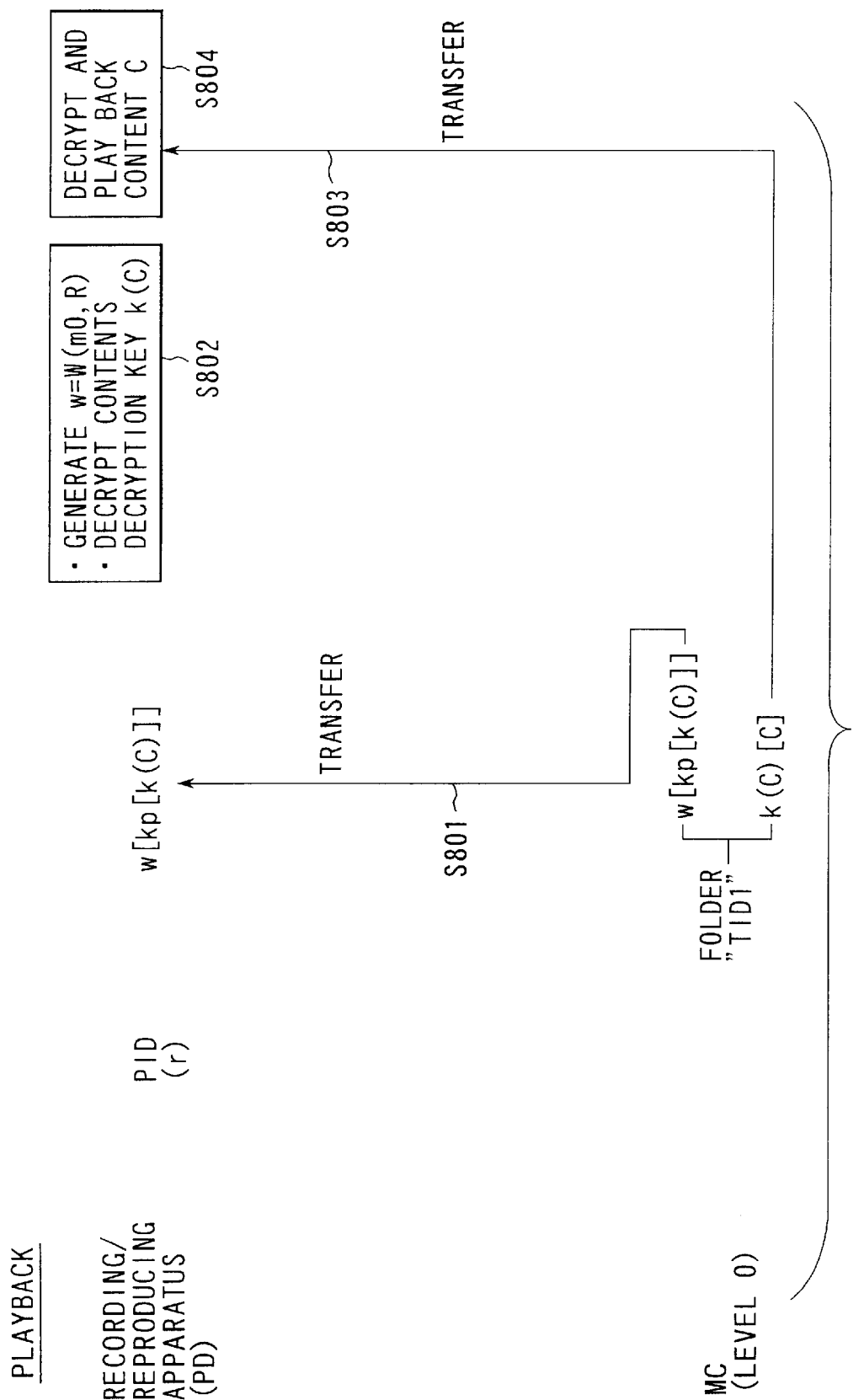
FIG. 17 is a diagram for explaining playback procedures when the type of the storage medium is level 0.

Referring now to FIG. 17, a description will be given of how to play back a copied content stored in the MC 13 of level 0. When the MC 13 is loaded into the PD 12, the PD 12 asks the MC 13 to transfer its ID information MID but the MC 13 does not have ID information, so that the PD 12 can discriminate that the type of the MC 13 is level 0. Accordingly, the PD 12 reads out w[Kp[K(C)]] from the memory area (only the public area) in the MC 13 (step S801), and generates an encryption key w using the ID information "PID" of the PD 12 itself, the random number r stored in the secret area of the PD 12 and the key generating algorithm W. The PD 12 then decrypts a contents decryption key K(C) from the encryption key w, the encryption key Kp and w[Kp[K(C)]] read from the MC 13 (step S802).

Then, the PD 12 reads an encrypted content K(C)[C] from the memory area (only the public area) in the MC 13 (step S803), decrypts the content C in the decryption section 12g, decodes the decrypted content in the decoder 12h, converts the resultant digital signal to an analog signal in the D/A conversion section 12i and plays back the music piece (step S804).

(Means for Regulating Recording of Copied Contents in MC Over Network)

To overcome the second conventional problem or to regulate recording of a content to the MC 13 over a network, a timeout discriminating section 4 is provided in the present invention as shown in FIG. 1.

The timeout discriminating section 4 sets a given restriction time and interrupts the sequence of procedures of reading and/or writing to the MC 13 when the sequence is not finished within the restriction time. Because communications over a network usually takes a considerably longer time than communications to a device which is directly connected, the timeout capability can cope with illegitimate copying over the network. It is also possible to use band restriction. Assuming that the band of communications with the device is constant, it is possible to compute the upper limit of the time need to transfer a certain size of data to the device. When the actual transfer time exceeds the computed time, the routine is interrupted.

Figure 22:
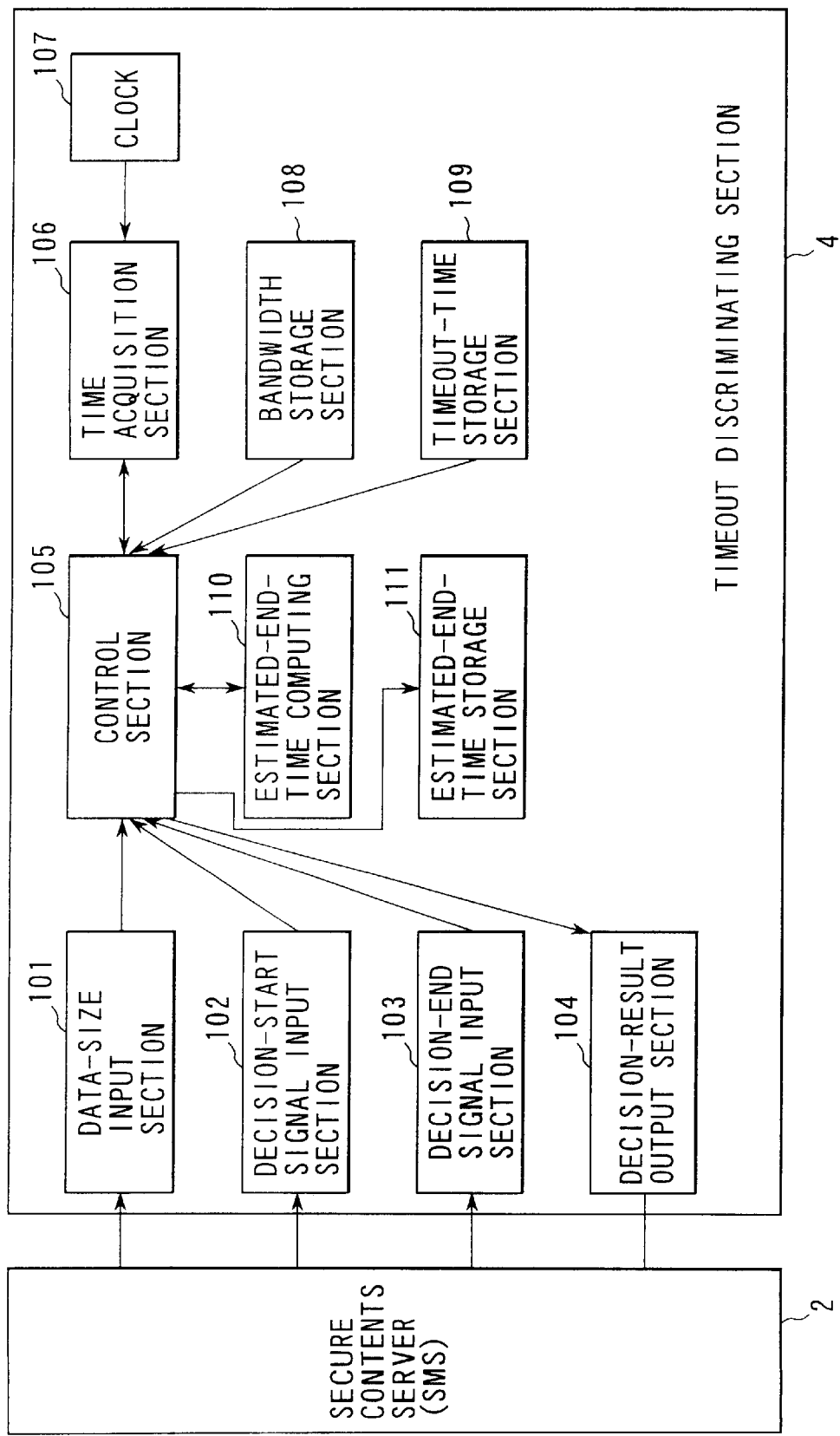
FIG. 22 is a diagram exemplifying the internal structure of a timeout determining section.
Figure 23:
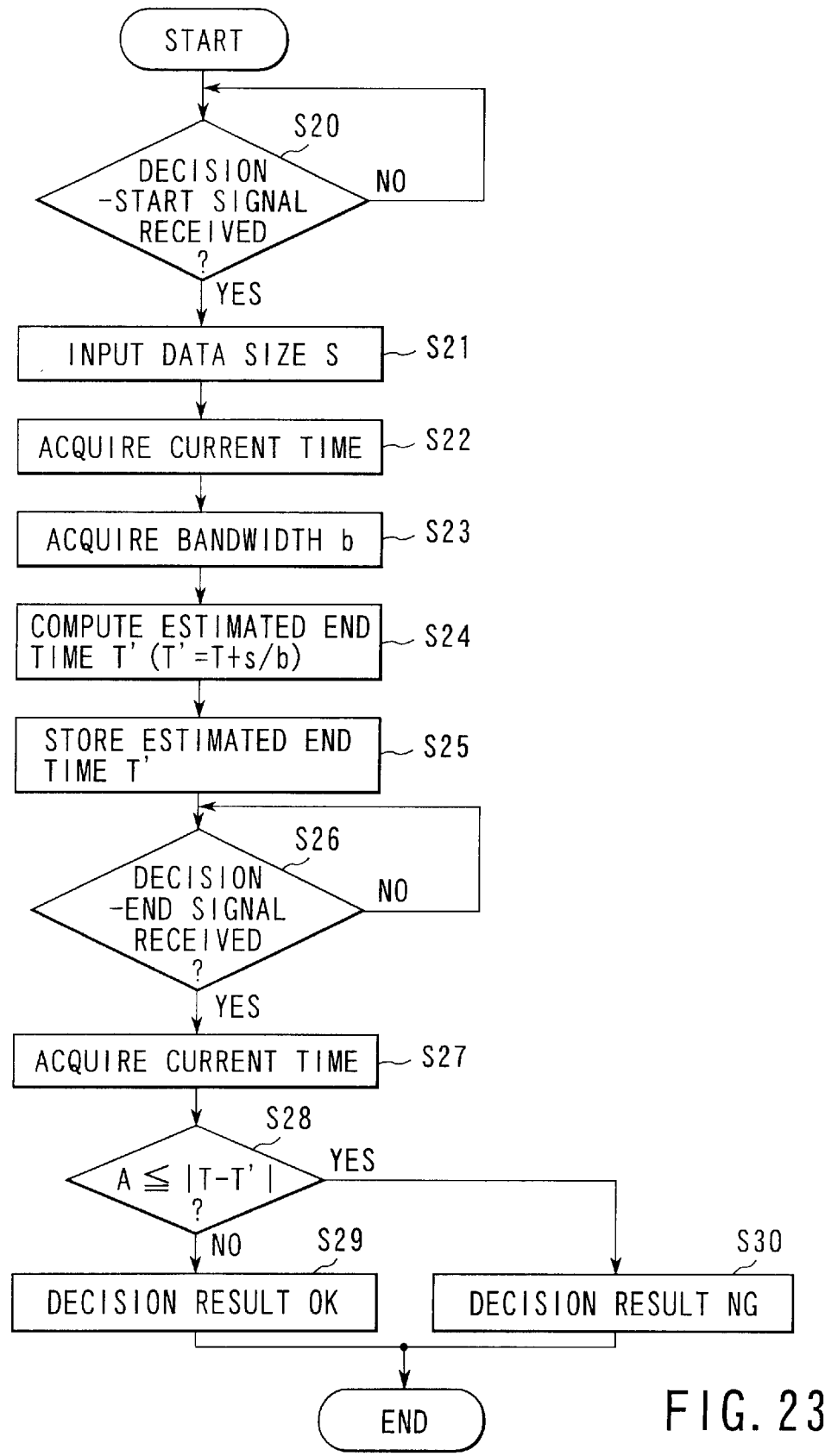
FIG. 23 is a flowchart for explaining one example of a timeout determining routine.

The above will be discussed below more specifically referring to the structure of the timeout discriminating section 4 shown in FIG. 22 and the flowchart shown in FIG. 23. Suppose that the timeout time has been preset to t and the communication bandwidth between the LCM 1 and the PD 12 is b. The operation of the timeout discriminating section 4 will be discussed with reference to the case where checkout is made to the MC 13 that is loaded into, for example, the PD 12.

When a reading/writing operation which is included in the procedures of making checkout to the MC 13 that is loaded into the PD 12 is initiated, the timeout discriminating section 4 receives a decision start signal from the SMS 2 via a decision-start signal input section 102 (step S20) and receives the size s of packet data, which is exchanged between the SMS 2 and the PD 12, from a data-size input section 101 (step S21). A control section 105 acquires the current time T from a clock 107 via a time acquisition section 106 (step S22). Accordingly, the control section 105 acquires a bandwidth b from a bandwidth storage section 108 (step S23), computes an estimated end time T' (step S24) and stores this estimated end time T' in an estimated-end-time storage section 111 (step S25).

The estimated end time T' can be acquired from an equation T'=T+s/b using the bandwidth b and the data size s.

When the timeout discriminating section 4 receives a decision-end signal from the SMS 2 via a decision-end signal input section 103 at the same time as the reading/writing operation to the MC 13 loaded in the PD 12 is finished (step S26), the control section 105 reacquires the current time T (step S27) and compares the difference between the previously computed estimated end time T' and the current time T with the timeout time t (step S28). When this difference is greater than the timeout time t, the control section 105 determines that the decision result is "NG" (No Good) and informs the SMS 2 of this decision result (step S30). If the PD 12 is connected to a PC #2 which is connected over a network to the LCM 1 that is located in a PC #1 which is different from the PC #2 and performs checkout as illustrated in FIG. 21, the decision result of "NG" is obtained so that the LCM 1 in the PC #1 interrupts the subsequent steps in the routine for making checkout.

Alternatively, the decision result may be made "NG" when the reading/writing operation has not been completed yet even after the estimated end time T' has passed.

The timeout discriminating section 4 may operate in two modes. One mode is taken when the data size s is input to the data-size input section 101, and at this time, the timeout discriminating section 4 computes the estimated end time T'=T+s/b and stores it in the estimated-end-time storage section 111. Upon reception of the decision-end signal, the timeout discriminating section 4 compares the current time T with the time T' stored in the estimated-end-time storage section 111. When the former time is smaller than the latter, the timeout discriminating section 4 informs the SMS 2 of the decision result being OK. Otherwise, the timeout discriminating section 4 informs the SMS 2 of the decision result being "NG".

The other mode takes place when the decision-start signal is input to the decision-start signal input section 102. In this mode, the timeout discriminating section 4 stores the current time T+timeout time t in the estimated-end-time storage section 111. The operation for determining the timeout in this mode is the same as that done in the first mode.

(Secret Area)

The LCM 1 of the present invention uses a secret area in order to store a checkin/checkout guest book. When the LCM 1 is constructed by a PC, this secret area is created on a hard disk (HDD).

The secret area on the HDD will now be discussed below.

Normally, partitions are present on the HDD. Each partition is recognized as one drive by the OS. Each partition contains a plurality of sectors on which data is recorded. The data allocation in the sectors is called a logical format. A file system generally has a file allocation table on which the positions of individual files and the directory on the sectors are recorded. The OS acquires the position of a file to be accessed by referring to the file allocation table, and accesses the target file. The physical allocation of the sectors is called a physical format. The individual partitions can have different physical formats. The position of each sector can be identified by the head position. The start position of each sector is identified by a magnetic mark.

The OS has a driver for the file system that the OS supports. The driver identifies the physical format and logical format of the file system, and can reach the file allocation table or each file by going over the sectors in each partition and then can read the contents of the file allocation table or the target file or write data therein.

Figure 24:
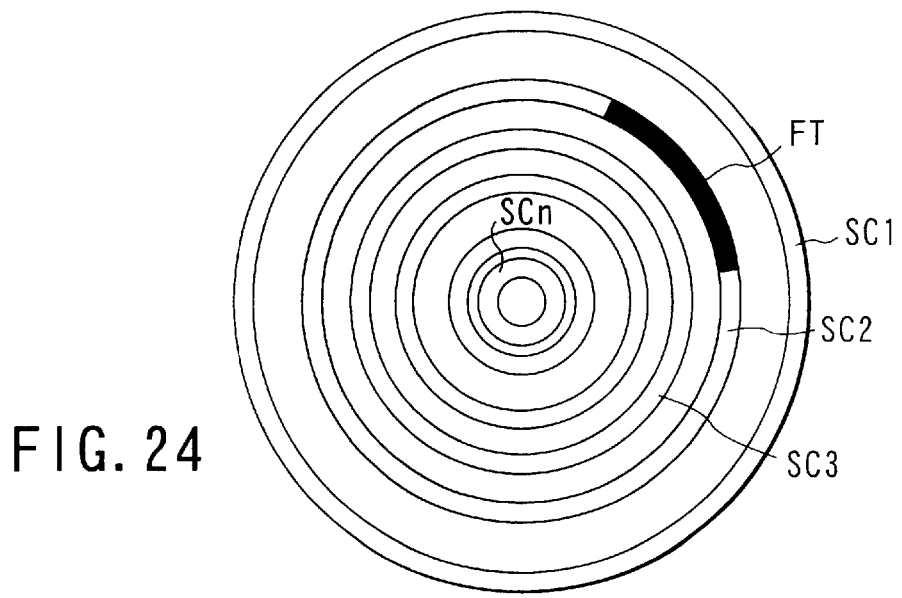
FIG. 24 is a diagram for explaining a file system which constitutes the secret area.

FIG. 24 shows the file system for constructing the secret area according to the present invention. Although the ordinary file system has sectors allocated at equal intervals, the present file system does not employ such allocation. A sector allocation table is located at the head of the first sector SC1. The sector allocation table has sector positions recorded therein in the following form.

Head position #2, head position #3, ..., and head position #n respectively indicate the positions of the second sector SC2, the third sector SC3, ..., and the n-th sector SCn.

The sector allocation table is encrypted. The key that decrypts this encryption depends on an ID specific to the system. The system's specific ID may be the ID of the OS, the ID of the BIOS or the ID of the CPU.

Further, a file allocation table FT is located at the head of the second sector SC2 in the following form.

(file 1, (sector number, intra-sector position))
(file 2, (sector number, intra-sector position))

.
.
.

The intra-sector position is the number of bytes from the head of the associated sector. The file allocation table FT is also encrypted. The key that decrypts this encryption likewise depends on the specific ID of the system.

Figure 25:
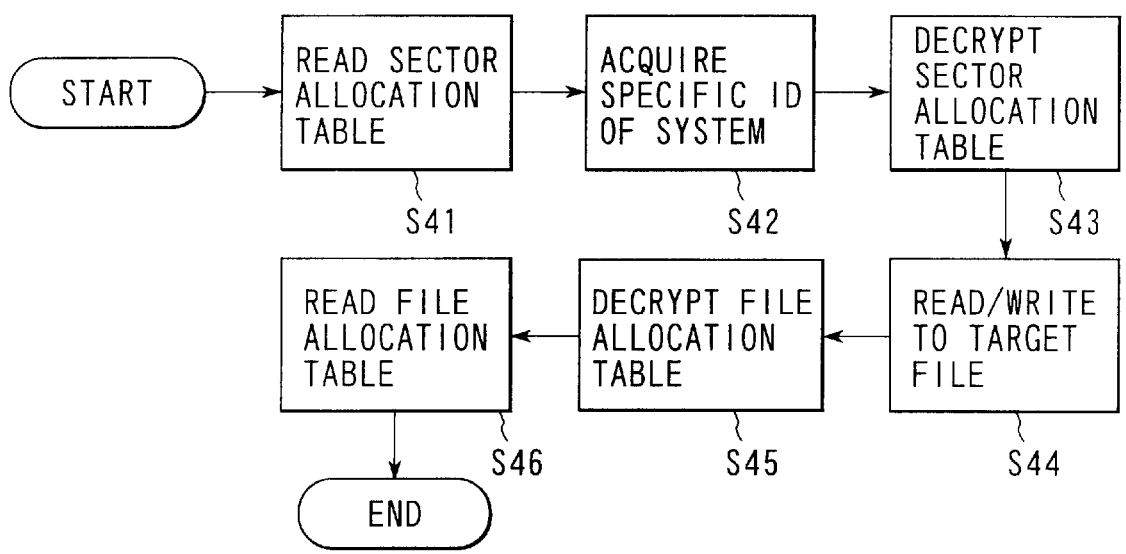
FIG. 25 is a flowchart for explaining the operation of a secret-area driver.
Figure 26:
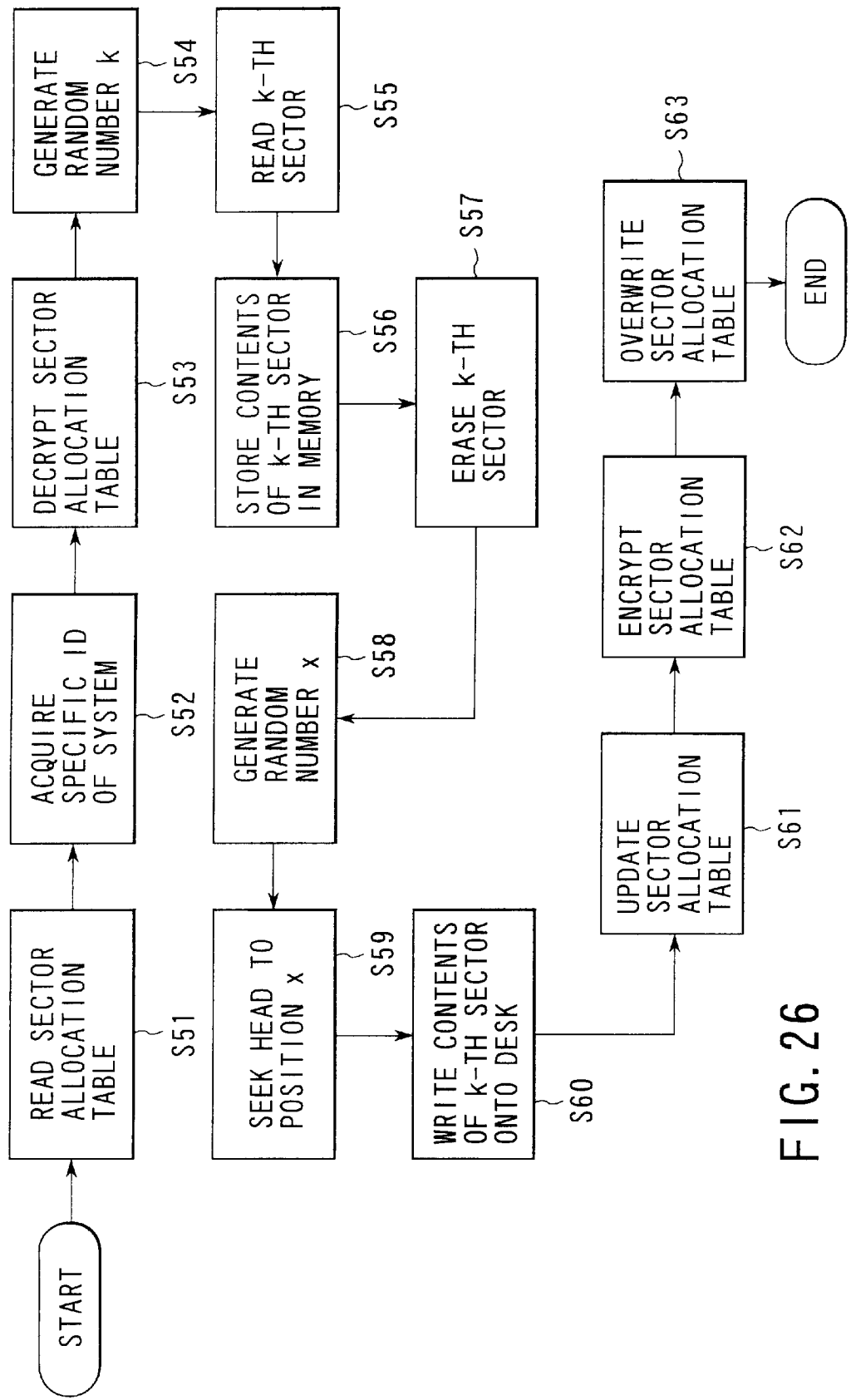
FIG. 26 is a flowchart for explaining the operation of the secret-area driver when sector allocation is updated.

Access to the file system of the present invention is executed by using a special driver (the secret-area driver 7 in FIG. 1). FIG. 25 shows the operation of the secret-area driver 7. This driver 7 has a capability of altering the sector allocation. FIG. 26 illustrates the operation of the secret-area driver 7 at the time of altering the sector allocation.

(Authentication)

The following will discuss an example of mutual authentication which is carried out, for example, when the MC 13 is loaded into the LCM 1 and an example of an authentication process which is executed at the time of accessing to the secret area. This authentication is the one that has conventionally been employed using a public-key encryption technique, but the present invention is in no way limited to this particular type.

Figure 20:
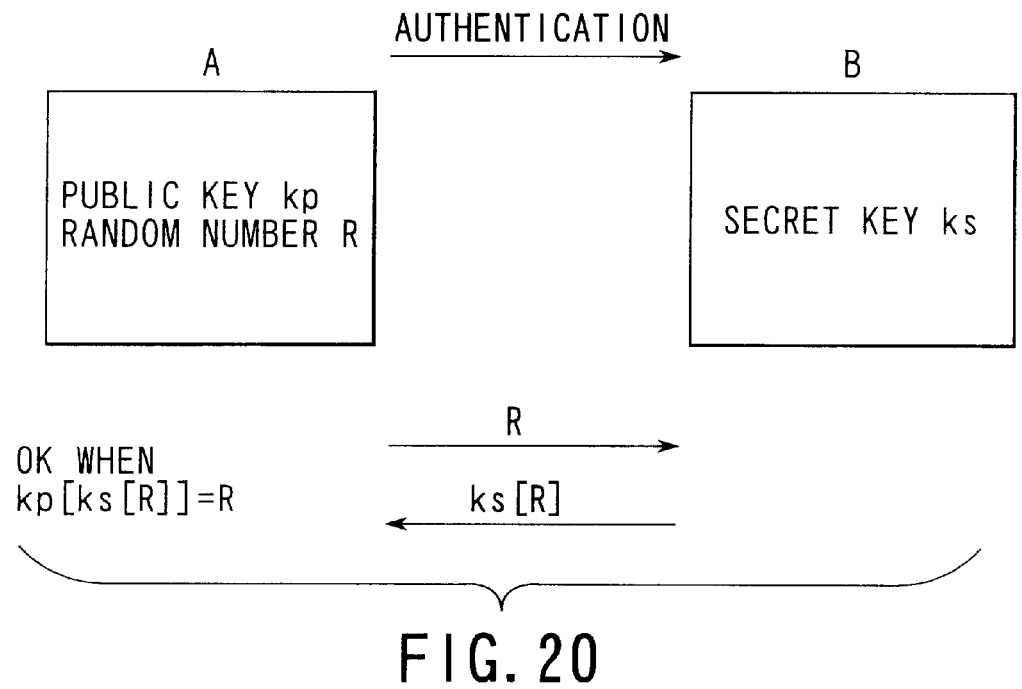
FIG. 20 is a diagram for explaining authentication procedures using a public-key encryption algorithm.

A description will be given of authentication between two devices (e.g., LCM 1 and MC 13) A and B in the case where A authenticates B that tries to gain access to A, by referring to FIG. 20.

In this case, the device A has a public key kp and the device B, if capable of accessing the device A, holds a secret key ks corresponding to the public key kp. When receiving a random number R generated by the device A, the device B encrypts the random number with the secret key ks (the encrypted number is represented by ks[R]) and sends ks[R] back to the device A. The device A decrypts ks[R] using the public key, and determines that the device B is legitimate one if the decryption result matches with the previously generated random number R.

Thereafter, the same procedures are performed on the device A from the device B to thereby ensure mutual authentication. In this case, the device B has a public key and the device A has a secret key and encrypts the random number, generated by the device B, by using the secret key. The device B decrypts the encrypted random number using the public key and checks if the decryption result matches with the previously generated random number.

As described in details, the present invention can efficiently regulate the number of copied contents and can thus adequately protect the copyright of contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A contents managing method capable of controlling content copying, comprising:
   providing content to which a predetermined number of allowable copies is allocated;
   decreasing the number of allowable copies allocated to the content when the content is copied onto a recording medium;
   storing identification information of the recording medium in a restricted memory area that is accessible through security procedures, when the content is copied onto the recording medium;
   allowing erasure of the copied content from the recording medium when the identification information of the recording medium is stored in the restricted memory area; and
   increasing the number of allowable copies allocated to the content when the copied content is erased from the recording medium.

2. The contents managing method according to claim 1, wherein the decreasing includes decreasing the number of allowable copies allocated to the content by "1" every time the content is copied onto the recording medium and the increasing includes increasing the number of allowable copies allocated to the content by "1" every time the copied content is erased from the recording medium.

3. The contents managing method according to claim 1, further comprising:
   storing not only identification information of the content but also a corresponding checkout list having identification information of the recording medium onto which the content has been copied; and
   controlling checkin/checkout of the content by referring to at least the stored identification information of the content and the corresponding checkout list.

4. A contents managing method capable of controlling content copying, comprising:
   providing content to which a predetermined number of allowable copies is allocated;
   decreasing the number of allowable copies allocated to the content when the content is copied onto a recording medium;
   storing flag information, which indicates whether the copied content on the recording medium is movable, in a restricted memory area that is accessible through security procedures; and
   increasing the number of allowable copies allocated to the content when the copied content is erased from the recording medium.

5. The contents managing method according to claim 4, wherein the decreasing includes decreasing the number of allowable copies allocated to the content by "1" every time the content is copied onto the recording medium and the increasing includes increasing the number of allowable copies allocated to the content by "1" every time the copied content is erased from the recording medium.

6. The contents managing method according to claim 4, further comprising:
   storing not only identification information of the content but also a corresponding checkout list having identification information of the recording medium onto which the content has been copied; and
   controlling checkin/checkout of the content by referring to at least the stored identification information of the content and the corresponding checkout list.

7. A contents managing method capable of controlling content copying, comprising:
   providing content to which a predetermined number of allowable copies is allocated;
   decreasing the number of allowable copies allocated to the content when the content is copied onto a recording medium,
   wherein the recording medium is one of a first type of recording medium comprising an area for storing identification information of said recording medium and a restricted memory area that is accessible through security procedures, a second type of recording medium comprising an area for storing identification information of the recording medium and an unrestricted memory area, and a third type of recording medium comprising an unrestricted memory area, and
   wherein a type of the recording medium is determined and a content regulation process based on the type is performed when one of recording the content on the recording medium, erasing the copied content on the recording medium when the identification information of the recording medium is stored in the restricted memory area, or reproducing the copied content on the recording medium is executed; and
   increasing the number of allowable copies allocated to the content when the copied content is erased from the recording medium.

8. The contents managing method according to claim 7, wherein the decreasing includes decreasing the number of allowable copies allocated to the content by "1" every time the content is copied onto the recording medium and the increasing includes increasing the number of allowable copies allocated to the content by "1" every time the copied content is erased from the recording medium.

9. The contents managing method according to claim 7, further comprising:
   storing not only identification information of the content but also a corresponding checkout list having identification information of the recording medium onto which the content has been copied; and controlling checkin/checkout of the content by referring to at least the stored identification information of the content and the corresponding checkout list.

10. A contents managing apparatus capable of controlling content copying, comprising:

a storage device configured to store content to which a predetermined number of allowable copies is allocated; and a manager configured to decrease the number of allowable copies allocated to the content when the content is copied onto a recording medium, to store identification information of the recording medium in a restricted memory area that is accessible through security procedures, when the content is copied onto the recording medium, to allow erasure of the copied content from the recording medium when the identification information of the recording medium is stored in the restricted memory area, and to increase the number of allowable copies allocated to the content when the copied content is erased from the recording medium.

11. The contents managing apparatus according to claim 10, wherein the manager decreases the number of allowable copies allocated to the content by "1" every time the content is copied onto the recording medium and increases the number of allowable copies allocated to the content by "1" every time the copied content is erased from the recording medium.

12. The contents managing apparatus according to claim 10, wherein the manager is further configured to store not only identification information of the content but also a corresponding checkout list having identification information of the recording medium onto which the content has been copied, and control checkin/checkout of the content by referring to at least the stored identification information of the content and the corresponding checkout list.

13. A contents managing apparatus capable of controlling content copying, comprising:

a storage device configured to store content to which a predetermined number of allowable copies is allocated; and a manager configured to decrease the number of allowable copies allocated to the content when the content is copied onto a recording medium, to store flag information, which indicates whether the copied content an the recording medium is movable, in a restricted memory area that is accessible through security procedures, and to increase the number of allowable copies allocated to the content when the copied content is erased from the recording medium.

14. The contents managing apparatus according to claim 13, wherein the manager decreases the number of allowable copies allocated to the content by "1" every time the content is copied onto the recording medium and increases the number of allowable copies allocated to the content by "1" every time the copied content is erased from the recording medium.

15. The contents managing apparatus according to claim 13, wherein the manager is further configured to store not only identification information of the content but also a corresponding checkout list having identification information of the recording medium onto which the content has been copied, and control checkin/checkout of the content by referring to at least the stored identification information of the content and the corresponding checkout list.

16. A contents managing apparatus capable of controlling content copying, comprising:

a storage device configured to store content to which a predetermined number of allowable copies is allocated; and a manager configured to decrease the number of allowable copies allocated to the content when the content is copied onto a recording medium and to increase the number of allowable copies allocated to the content when the copied content is erased from the recording medium, and wherein the recording medium is one of a first type of recording medium comprising an area for storing identification information of the recording medium and a restricted memory area that is accessible through security procedures, a second type of recording medium comprising an area for storing identification information of the recording medium and an unrestricted memory area, and a third type of recording medium comprising an unrestricted memory area, and the manager is further configured to determine a type of the recording medium and perform a content regulation process based on the type when executing one of recording the content on the recording medium, erasing the copied content on the recording medium, or reproducing the copied content on the recording medium.

17. The contents managing apparatus according to claim 13, wherein the manager decreases the number of allowable copies allocated to the content by "1" every time the content is copied onto the recording medium and increases the number of allowable copies allocated to the content by "1" every time the copied content is erased from the recording medium.

18. The contents managing apparatus according to claim 13, wherein the manager is further configured to store not only identification information of the content but also a corresponding checkout list having identification information of the recording medium onto which the content has been copied, and control checkin/checkout of the content by referring to at least the stored identification information of the content and the corresponding checkout list.

* * * * *

UNITED STATES PATENT AND TRADEMARK OFFICE
CERTIFICATE OF CORRECTION

PATENT NO. : 6,847,950 B1  
DATED : January 25, 2005  
INVENTOR(S) : Kamibayashi et al.

It is certified that error appears in the above-identified patent and that said Letters Patent is hereby corrected as shown below:

Column 19,
Line 48, change "an" to -- and --.

Signed and Sealed this

Thirty-first Day of May, 2005

JON W. DUDAS
*Director of the United States Patent and Trademark Office*